US010287366B2

(12) United States Patent
Staunstrup et al.

(10) Patent No.: US 10,287,366 B2
(45) Date of Patent: May 14, 2019

(54) METHODS OF PRODUCING ACTIVATED PECTIN-CONTAINING BIOMASS COMPOSITIONS

(71) Applicant: CP Kelco ApS, Lille Skensved (DK)

(72) Inventors: Jan Aae Staunstrup, Vanloese (DK); Carsten Klit, Store Heddinge (DK); Jens Eskil Trudsø, Roskilde (DK); Tommy Ewi Pedersen, Roskilde (DK); Donald F. Hiscock, Saint Louis, MO (US)

(73) Assignee: CP Kelco ApS, Lille Skensved (DK)

( * ) Notice: Subject to any disclaimer, the term of this patent is extended or adjusted under 35 U.S.C. 154(b) by 0 days.

(21) Appl. No.: 15/892,639

(22) Filed: Feb. 9, 2018

(65) Prior Publication Data
US 2018/0230242 A1    Aug. 16, 2018

Related U.S. Application Data

(60) Provisional application No. 62/459,136, filed on Feb. 15, 2017.

(51) Int. Cl.
*C08B 37/00* (2006.01)
*A23L 33/24* (2016.01)
*A23L 19/00* (2016.01)

(52) U.S. Cl.
CPC .......... *C08B 37/0048* (2013.01); *A23L 19/07* (2016.08); *A23L 33/24* (2016.08); *A23V 2002/00* (2013.01)

(58) Field of Classification Search
CPC ...... C08B 37/0048; A23L 19/07; A23L 33/24; A23V 2002/00
See application file for complete search history.

(56) References Cited

U.S. PATENT DOCUMENTS

| | | | |
|---|---|---|---|
| 2,273,521 A | 2/1942 | Hirsch | |
| 2,626,706 A * | 1/1953 | Bishop | C08B 37/0045 536/2 |
| 5,964,983 A | 10/1999 | Dinand et al. | |
| 6,737,089 B2 | 5/2004 | Wadsworth et al. | |
| 7,604,714 B2 | 10/2009 | Luo et al. | |
| 7,608,167 B2 | 10/2009 | Luo et al. | |
| 7,629,010 B2 | 12/2009 | Passarelli et al. | |
| 7,820,873 B2 | 10/2010 | Sun et al. | |
| 7,833,558 B2 | 11/2010 | Larsen et al. | |
| 7,842,307 B2 | 11/2010 | Oshlack et al. | |
| 7,947,322 B2 | 5/2011 | Bialek et al. | |
| 7,981,458 B2 | 7/2011 | Takamine et al. | |
| 7,994,111 B2 | 8/2011 | Caggioni et al. | |
| 8,017,171 B2 | 9/2011 | Sample | |
| 8,097,574 B2 | 1/2012 | Heath et al. | |
| 8,309,154 B2 | 11/2012 | Cai et al. | |
| 8,323,513 B2 | 12/2012 | Trudsoe et al. | |
| 8,383,186 B2 | 2/2013 | Sample | |
| 8,399,040 B2 | 3/2013 | Lundberg et al. | |
| 8,481,096 B2 | 7/2013 | Kopas-Lane | |
| 8,481,099 B2 | 7/2013 | Nafisi-Movaghar et al. | |
| 8,512,778 B2 | 8/2013 | Levin et al. | |
| 8,563,069 B2 | 10/2013 | Homsma et al. | |
| 8,591,982 B2 | 11/2013 | Lundberg et al. | |
| 8,597,708 B2 | 12/2013 | Blijdenstein et al. | |
| 8,637,106 B2 | 1/2014 | Kou | |
| 8,647,689 B2 | 2/2014 | Vanhemelrijck et al. | |

(Continued)

FOREIGN PATENT DOCUMENTS

EP    1342778 B1    11/2006
EP    1553850 B1    2/2008

(Continued)

OTHER PUBLICATIONS

Notice of Allowance and Intention to Grant dated Oct. 9, 2018 for EP App. No. 18 705 890.4, entitled "Activated Pectin-Containing Biomass Compositions, Products, and Methods of Producing," 8 pages.

Chan et al., entitled "*Pectin as a rheology modifier: Origin, structure, commercial production and rheology*," Carbohydrate polymers applied Science Publishers, Ltd. Barker, GB, vol. 161, Dec. 24, 2016, pp. 118-139.

Guo et al, entitled "*Using the high temperature resistant pH electrode to auxiliarily study the sugar beet pectin extraction under different extraction conditions*," Food Hydrocolloids, vol. 70, Mar. 30, 2017, pp. 105-113.

"*High shear mixing advances for foods, pharmaceuticals, cosmetics*," Processing's 2001 Mixing, Blending & Size Reduction Handbook, pp. 1-8.

International Search Report and the Written Opinion of the International Searching Authority in PCT/EP2018/053722 dated Apr. 17, 2018, 12 pages.

(Continued)

*Primary Examiner* — Anthony J Weier
(74) *Attorney, Agent, or Firm* — Merchant & Gould PC

(57) ABSTRACT

Methods for producing an activated pectin-containing biomass composition are provided. The method includes (A) mixing a starting pectin-containing biomass material having an insoluble fiber component and an insoluble protopectin component with an aqueous solution of an alcohol to form a mixture; (B) activating the starting pectin-containing biomass material to form an activated pectin-containing biomass material having the insoluble fiber component and a soluble pectin component by subjecting the starting pectin-containing biomass material to (i) an activating solution formed by adding acid to the mixture to adjust the pH of the mixture within the range from at or about 0.5 to at or about 2.5 and (ii) heat to a temperature greater than at or about 40 degrees Celsius; and (C) applying mechanical energy either (i) to the mixture of step A), (ii) during the activating of step B), or (iii) to the mixture of step A) and during the activating of step B); and (D) separating the activated pectin-containing biomass material from the mixture; wherein during the method the alcohol present in the mixture is at or greater than about 40 weight percent based on the total weight of the mixture. Activated pectin-containing biomass compositions are also provided.

28 Claims, 2 Drawing Sheets

(56) References Cited

U.S. PATENT DOCUMENTS

| | | |
|---|---|---|
| 8,884,002 B2 | 11/2014 | Lundberg |
| 8,945,659 B2 | 2/2015 | Almeida Rivera et al. |
| 8,956,680 B2 | 2/2015 | Quessette et al. |
| 9,192,182 B2 | 11/2015 | Sample |
| 9,226,519 B2 | 1/2016 | Domingues et al. |
| 9,267,050 B2 | 2/2016 | Heiskanen et al. |
| 9,365,972 B2 | 6/2016 | Scharpf et al. |
| 9,370,478 B2 | 6/2016 | Bonner et al. |
| 9,382,339 B2 | 7/2016 | Clark et al. |
| 9,446,137 B2 | 9/2016 | Magome et al. |
| 9,469,695 B2 | 10/2016 | Dahl et al. |
| 9,499,640 B2 | 11/2016 | Trudsoe |
| 9,545,364 B2 | 1/2017 | Glenn, Jr. et al. |
| 9,546,223 B2 | 1/2017 | Trudsoe et al. |
| 9,572,358 B2 | 2/2017 | Whitehouse |
| 9,587,038 B2 | 3/2017 | Rasanen et al. |
| 9,591,866 B2 | 3/2017 | Dose et al. |
| 9,592,199 B2 | 3/2017 | Obae et al. |
| 9,610,379 B2 | 4/2017 | Vanerek et al. |
| 9,617,459 B2 | 4/2017 | Van Engelen et al. |
| 9,629,790 B2 | 4/2017 | Lundberg et al. |
| 9,643,147 B2 | 5/2017 | Van Engelen et al. |
| 9,668,507 B2 | 6/2017 | Richardson et al. |
| 9,670,622 B2 | 6/2017 | Ono et al. |
| 9,677,030 B2 | 6/2017 | Napolitano |
| 9,771,435 B2 | 9/2017 | Santanocito et al. |
| 9,834,664 B2 | 12/2017 | Hepworth et al. |
| 9,844,225 B2 | 12/2017 | Savant |
| 9,862,916 B2 | 1/2018 | Van Engelen et al. |
| 9,869,037 B2 | 1/2018 | Agboh |
| 9,877,924 B2 | 1/2018 | Wright et al. |
| 9,926,654 B2 | 3/2018 | Baer et al. |
| 9,949,609 B2 | 4/2018 | Baer et al. |
| 2003/0220039 A1 | 11/2003 | Chen et al. |
| 2004/0081742 A1 | 4/2004 | Levi et al. |
| 2005/0074542 A1 | 4/2005 | Lundberg et al. |
| 2005/0271790 A1 | 12/2005 | Aronson et al. |
| 2006/0099302 A1 | 5/2006 | Christensen |
| 2006/0251789 A1 | 11/2006 | Lundberg et al. |
| 2007/0026124 A1 | 2/2007 | Yuan et al. |
| 2007/0202211 A1 | 8/2007 | Altom et al. |
| 2008/0147026 A1 | 6/2008 | Qin et al. |
| 2008/0166464 A1 | 7/2008 | Lundberg et al. |
| 2008/0193590 A1 | 8/2008 | Lundberg |
| 2008/0227892 A1 | 9/2008 | van der Wielen et al. |
| 2009/0017168 A1 | 1/2009 | Treece et al. |
| 2009/0214718 A1 | 8/2009 | Leusner |
| 2009/0269376 A1 | 10/2009 | Lundberg et al. |
| 2009/0306254 A1 | 12/2009 | van der Wielen et al. |
| 2010/0186420 A1 | 7/2010 | Berry et al. |
| 2010/0189857 A1 | 7/2010 | Blijdenstein et al. |
| 2010/0291280 A1 | 11/2010 | Blijdenstein et al. |
| 2011/0059883 A1 | 3/2011 | Swazey, Jr. et al. |
| 2011/0293813 A1 | 12/2011 | Cavallini et al. |
| 2012/0115964 A1 | 5/2012 | Foster et al. |
| 2012/0135109 A1 | 5/2012 | Paeschke |
| 2012/0156185 A1 | 6/2012 | Solomon et al. |
| 2012/0183646 A1 | 7/2012 | de Laat |
| 2012/0288598 A1 | 11/2012 | Leusner |
| 2012/0302440 A1 | 11/2012 | Theliander et al. |
| 2013/0025500 A1 | 1/2013 | Jones et al. |
| 2013/0101724 A1 | 4/2013 | Kawamoto et al. |
| 2013/0131012 A1 | 5/2013 | Gusek et al. |
| 2014/0037817 A1 | 2/2014 | Weibel |
| 2014/0106053 A1 | 4/2014 | Rudie et al. |
| 2014/0128480 A1 | 5/2014 | Swazey et al. |
| 2014/0166222 A1 | 6/2014 | Delrue et al. |
| 2014/0242229 A1 | 8/2014 | Whitehouse |
| 2014/0272090 A1 | 9/2014 | Crump |
| 2014/0273704 A1 | 9/2014 | Baer et al. |
| 2014/0295048 A1 | 10/2014 | Kunz et al. |
| 2014/0350144 A1 | 11/2014 | Hepworth et al. |
| 2014/0356463 A1 | 12/2014 | Gusek et al. |
| 2014/0363560 A1 | 12/2014 | Lundberg |
| 2014/0377442 A1 | 12/2014 | Obata et al. |
| 2014/0378362 A1 | 12/2014 | Cooke et al. |
| 2015/0024108 A1 | 1/2015 | Lundberg et al. |
| 2015/0050399 A1 | 2/2015 | van Gastel et al. |
| 2015/0059617 A1 | 3/2015 | Hepworth et al. |
| 2015/0101771 A1 | 4/2015 | Moss et al. |
| 2015/0159119 A1 | 6/2015 | Fernandez-Prieto et al. |
| 2015/0189902 A1 | 7/2015 | Silva Paes et al. |
| 2015/0191612 A1 | 7/2015 | Van Engelen et al. |
| 2015/0203737 A1 | 7/2015 | Van Engelen et al. |
| 2015/0210967 A1 | 7/2015 | Van Engelen et al. |
| 2015/0290262 A1 | 10/2015 | Lundberg |
| 2015/0335040 A1 | 11/2015 | Koppert et al. |
| 2015/0361616 A1 | 12/2015 | Essaddam |
| 2015/0366256 A1 | 12/2015 | Book et al. |
| 2015/0376301 A1 | 12/2015 | Sorensen et al. |
| 2016/0000776 A1 | 1/2016 | Wright et al. |
| 2016/0029673 A1 | 2/2016 | Sample |
| 2016/0030907 A1 | 2/2016 | Van Engelen et al. |
| 2016/0101026 A1 | 4/2016 | Pratt et al. |
| 2016/0130536 A1 | 5/2016 | Jones et al. |
| 2016/0168273 A1 | 6/2016 | Hepworth et al. |
| 2016/0168274 A1 | 6/2016 | Hepworth et al. |
| 2016/0208430 A1 | 7/2016 | Duffy et al. |
| 2016/0264487 A1 | 9/2016 | Kratz et al. |
| 2016/0289893 A1 | 10/2016 | Martin et al. |
| 2016/0295875 A1 | 10/2016 | Bouman et al. |
| 2016/0302459 A1 | 10/2016 | Alexandre et al. |
| 2016/0330995 A1 | 11/2016 | Judge et al. |
| 2016/0374371 A1 | 12/2016 | Moss et al. |
| 2017/0049140 A1 | 2/2017 | Regismond et al. |
| 2017/0051233 A1 | 2/2017 | Coope-Epstein et al. |
| 2017/0064987 A1 | 3/2017 | Hyuseinov et al. |
| 2017/0067207 A1 | 3/2017 | Mälkki |
| 2017/0073433 A1 | 3/2017 | Luzio |
| 2017/0112177 A1 | 4/2017 | Lemmers et al. |
| 2017/0119024 A1 | 5/2017 | Shin |
| 2017/0121427 A1 | 5/2017 | Atalla et al. |
| 2017/0127716 A1 | 5/2017 | Lundberg |
| 2017/0166843 A1 | 6/2017 | Fernandez Martinez et al. |
| 2017/0167079 A1 | 6/2017 | Hepworth et al. |
| 2017/0173000 A1 | 6/2017 | Sackler |
| 2017/0175052 A1 | 6/2017 | Howard et al. |
| 2017/0191003 A1 | 7/2017 | Fernandez-Prieto et al. |
| 2017/0191005 A1 | 7/2017 | Foverskov et al. |
| 2017/0202246 A1 | 7/2017 | Arcas Minarro et al. |
| 2017/0204304 A1 | 7/2017 | Yu et al. |
| 2017/0204567 A1 | 7/2017 | Yu et al. |
| 2017/0226330 A1 | 8/2017 | Foverskov et al. |
| 2017/0258728 A1 | 9/2017 | Yoshida et al. |
| 2017/0273340 A1 | 9/2017 | Du Preez et al. |
| 2017/0313788 A1 | 11/2017 | Lillandt et al. |
| 2017/0354654 A1 | 12/2017 | Sackler |
| 2017/0360063 A1 | 12/2017 | Farr et al. |
| 2017/0367379 A1 | 12/2017 | Graf |
| 2018/0002638 A1 | 1/2018 | Flendrig et al. |
| 2018/0021330 A1 | 1/2018 | Oshlack et al. |
| 2018/0023042 A1 | 1/2018 | Lant et al. |
| 2018/0030379 A1 | 2/2018 | Fernandez-Prieto et al. |
| 2018/0051099 A1 | 2/2018 | Yadav et al. |
| 2018/0084819 A1 | 3/2018 | Bleiel et al. |
| 2018/0119235 A1 | 5/2018 | Talianski et al. |
| 2018/0119346 A1 | 5/2018 | Tan et al. |
| 2018/0125086 A1 | 5/2018 | Marinov et al. |
| 2018/0139972 A1 | 5/2018 | Schober et al. |

FOREIGN PATENT DOCUMENTS

| | | |
|---|---|---|
| EP | 1765093 B1 | 4/2008 |
| EP | 1781710 B1 | 7/2008 |
| EP | 1496757 B1 | 9/2008 |
| EP | 1890559 B1 | 3/2010 |
| EP | 2053999 B1 | 3/2011 |
| EP | 2068948 B1 | 3/2011 |
| EP | 2217081 B1 | 3/2011 |
| EP | 1761135 B1 | 4/2011 |
| EP | 1732402 B1 | 8/2012 |
| EP | 2358221 B1 | 9/2012 |
| EP | 1784087 B1 | 10/2012 |
| EP | 1675478 B1 | 11/2012 |

(56) References Cited

FOREIGN PATENT DOCUMENTS

| | | |
|---|---|---|
| EP | 2086349 B1 | 11/2012 |
| EP | 1675479 B1 | 3/2013 |
| EP | 2408893 B1 | 4/2013 |
| EP | 2560498 B1 | 6/2014 |
| EP | 2575484 B1 | 7/2014 |
| EP | 2645873 B1 | 9/2014 |
| EP | 1812120 B1 | 4/2015 |
| EP | 2629629 B1 | 5/2015 |
| EP | 2640815 B1 | 6/2015 |
| EP | 1560975 B1 | 9/2015 |
| EP | 2933377 A1 | 10/2015 |
| EP | 1643859 B1 | 11/2015 |
| EP | 2603196 B1 | 12/2015 |
| EP | 2841551 B1 | 12/2015 |
| EP | 2408892 B1 | 1/2016 |
| EP | 2841550 B1 | 1/2016 |
| EP | 2987415 A1 | 2/2016 |
| EP | 2287234 B1 | 3/2016 |
| EP | 1873196 B1 | 4/2016 |
| EP | 2925845 B1 | 5/2016 |
| EP | 2207576 B1 | 6/2016 |
| EP | 2496676 B1 | 6/2016 |
| EP | 2630224 B1 | 6/2016 |
| EP | 2841547 B1 | 7/2016 |
| EP | 1831260 B1 | 8/2016 |
| EP | 2377992 B1 | 8/2016 |
| EP | 1853633 B1 | 9/2016 |
| EP | 1858970 B2 | 10/2016 |
| EP | 2185003 B1 | 10/2016 |
| EP | 2686381 B1 | 10/2016 |
| EP | 2365762 B1 | 11/2016 |
| EP | 2825055 B1 | 11/2016 |
| EP | 2222189 B1 | 12/2016 |
| EP | 2866589 B1 | 12/2016 |
| EP | 2554587 B1 | 1/2017 |
| EP | 2804671 B1 | 3/2017 |
| EP | 2877496 B1 | 3/2017 |
| EP | 3060639 B1 | 4/2017 |
| EP | 2384123 B1 | 5/2017 |
| EP | 3136878 B1 | 8/2017 |
| EP | 3216917 A2 | 9/2017 |
| EP | 1896508 B1 | 10/2017 |
| EP | 2756762 B1 | 11/2017 |
| EP | 2893068 B1 | 12/2017 |
| EP | 3157358 B1 | 12/2017 |
| EP | 2408857 B1 | 1/2018 |
| EP | 2903656 B1 | 2/2018 |
| EP | 2934162 B1 | 2/2018 |
| EP | 3284758 A1 | 2/2018 |
| GB | 2 311 024 | 9/1997 |
| WO | WO01/17376 | 3/2001 |
| WO | WO 01/38400 | 5/2001 |
| WO | WO01/66600 A1 | 9/2001 |
| WO | WO2007/092087 A2 | 8/2007 |
| WO | WO2007/140277 A1 | 12/2007 |
| WO | WO2009/101545 A1 | 8/2009 |
| WO | WO2012/052306 A1 | 4/2012 |
| WO | WO2013/160023 A1 | 10/2013 |
| WO | WO2013/160025 A1 | 10/2013 |
| WO | WO2014/082835 A1 | 6/2014 |
| WO | WO2014/082951 A2 | 6/2014 |
| WO | WO2014/181944 A1 | 11/2014 |
| WO | WO2015/028656 A1 | 3/2015 |
| WO | WO2015/031418 A1 | 3/2015 |
| WO | WO2015/059031 A1 | 4/2015 |
| WO | WO2014/202997 A2 | 5/2015 |
| WO | WO2015/071023 A1 | 5/2015 |
| WO | WO2015/137647 A1 | 9/2015 |
| WO | WO2015/165588 A1 | 11/2015 |
| WO | WO2015/169778 A1 | 11/2015 |
| WO | WO2015/193201 A1 | 12/2015 |
| WO | WO2016/001635 A1 | 1/2016 |
| WO | WO2016/013946 A1 | 1/2016 |
| WO | WO2016/075016 A1 | 5/2016 |
| WO | WO2016/142550 A1 | 9/2016 |
| WO | WO2016/193535 A1 | 12/2016 |
| WO | WO2016/202986 A1 | 12/2016 |
| WO | WO2017/007894 A1 | 1/2017 |
| WO | WO2017/009042 A1 | 1/2017 |
| WO | WO2017/019176 A1 | 2/2017 |
| WO | WO2017/019752 A1 | 2/2017 |
| WO | WO2017/023722 A1 | 2/2017 |
| WO | WO2017/046754 A1 | 3/2017 |
| WO | WO2017/067899 A1 | 4/2017 |
| WO | WO2017/067901 A1 | 4/2017 |
| WO | WO2017/108055 A1 | 6/2017 |
| WO | WO2017/112763 A1 | 6/2017 |
| WO | WO2017/172711 A1 | 10/2017 |
| WO | WO2017/172718 A1 | 10/2017 |
| WO | WO2017/174260 A1 | 10/2017 |
| WO | WO2017/177085 A1 | 10/2017 |
| WO | WO2017/106646 A9 | 11/2017 |
| WO | WO2017/192445 A1 | 11/2017 |
| WO | WO2017/207259 A1 | 12/2017 |
| WO | WO2018/002446 A1 | 1/2018 |
| WO | WO2018/005480 A1 | 1/2018 |
| WO | WO2018/009532 A1 | 1/2018 |
| WO | WO2018/009749 A1 | 1/2018 |

OTHER PUBLICATIONS

Sakai et al., entitled "*Pectin, Pectinase, and Protopectinase: Production, Properties and Applications,*"Advances in Applied Microbiology, New York, NY, US, vol. 39 Jan. 1, 1993, pp. 213-294.

Sousa et al., entitled "*The impact of rhamnogalacturonan-I side chain monosaccharides on the rheological properties of citrus pectin,*" Food Hydrocolloids, vol. 47, Jan. 2015, pp. 130-139.

\* cited by examiner

METHODS OF PRODUCING ACTIVATED PECTIN-CONTAINING BIOMASS COMPOSITIONS

REFERENCE TO RELATED APPLICATION

This application claims the benefit of U.S. Provisional Application Ser. No. 62/459,136, filed on Feb. 15, 2017, the disclosure of which is incorporated herein by reference in its entirety.

BACKGROUND

Dietary fiber or roughage is the indigestible portion of food derived from plants. The consumption of foods high in fiber has been found to reduce appetite. Dietary fiber is made up of soluble and insoluble fiber. Soluble fiber, which dissolves in water, is readily fermented in the colon into gases and physiologically active byproducts and can be prebiotic and viscous. Insoluble fiber, which does not dissolve in water, is either metabolically inert and provides bulking or can be prebiotic and metabolically fermented in the large intestine.

Dietary fibers can act by changing the nature of the contents of the gastrointestinal tract and by changing how other nutrients and chemicals are absorbed. Some types of soluble fiber absorb water to become a gelatinous, viscous substance which is fermented by bacteria in the digestive tract. Some types of insoluble fiber have bulking action and are not fermented. Lignin, a major dietary insoluble fiber source, may alter the rate and metabolism of soluble fibers. Other types of insoluble fiber, notably resistant starch, are fully fermented.

Chemically, dietary fiber consists of non-starch polysaccharides such as arabinoxylans, cellulose and many other plant components such as resistant starch, resistant dextrins, inulin, lignin, waxes, chitins, pectins, beta-glucans, and oligosaccharides. A novel position has been adopted by the US Department of Agriculture to include functional fibers as isolated fiber sources that may be included in the diet. The term "fiber" is something of a misnomer, since many types of so-called dietary fiber are not actually fibrous.

Food sources of dietary fiber are often divided according to whether they provide predominantly soluble or insoluble fiber. Plant foods contain both types of fiber in varying degrees, according to the plant's characteristics.

Advantages of consuming fiber are the production of healthful compounds during the fermentation of soluble fiber and insoluble fiber's ability (via its passive hygroscopic properties) to increase bulk, soften stool, and shorten transit time through the intestinal tract.

Often dietary fiber compositions are used in the food or consumer product industry for their functional properties that include viscosifying, water absorbing, bulking, emulsifying and even gelling properties. The addition of a functional dietary fiber can provide textural benefits, nutritional benefits, and in some cases simpler labels replacing less consumer friendly options.

Some plants contain pectin as the soluble fiber component. Pectin is a polysaccharide useful as a colloidal in many applications such as food products, beverages, personal care products, pharmaceuticals, and detergents. Typically, pectin is commercially recovered in its water soluble form from a pectin-containing biomass material by extraction.

Unfortunately, the pectin extraction process is often harsh resulting in the degradation of the quality of pectin measured as intrinsic viscosity. Pectin with a higher intrinsic viscosity is often desirable because high intrinsic viscosity indicates that the extracted pectin is closer to its original state in the raw material and therefore has not been degraded during the extraction process. From a cost optimization perspective, the extraction process should be designed to extract the greatest amount of pectin available from plants, but pectin yield is often limited in exchange for pectin quality. Further, processing of plants is also challenging due to the proclivity of pectin to bind with water.

Thus, there remains a need for providing a dietary fiber from pectin-containing plants that can be processed with ease and retain both soluble and insoluble fiber components with high quality properties.

SUMMARY

It is an object of the present disclosure to provide a method for producing an activated pectin-containing biomass composition from a starting pectin-containing biomass material, the activated pectin-containing biomass composition, and a product comprising such an activated pectin-containing biomass composition. This can be achieved by the features as defined by the independent claims. Further enhancements are characterized by the dependent claims. It has now surprisingly been found that a starting pectin-containing biomass material comprising insoluble protopectin and insoluble fiber (e.g. cellulosic fiber from citrus peel) can be treated with an activating solution comprising an alcohol and an acid under certain conditions and exposed to a certain amount of mechanical energy under non-laminar flow to transform the insoluble protopectin to soluble pectin in situ and to partially fibrillate a portion of the cellulosic fibers into fibrils. The result is an activated pectin-containing biomass composition containing the soluble pectin component and the insoluble fiber component interacting to form an open network providing for a final composition with increased apparent viscosity and water binding characteristics and a high ratio of soluble pectin to insoluble fiber. Further, the soluble pectin component through this treatment becomes soluble in water, i.e. cold water, and may be extracted without adding heat, thus overcoming some of the disadvantages related to traditional methods of extracting pectin from a pectin-containing biomass material.

Methods for producing an activated pectin-containing biomass composition are provided, such as methods in which citrus peel is the starting pectin-containing biomass material and the resulting activated pectin-containing biomass composition has a coil overlap parameter of at or about 2 or greater. The methods include (A) mixing a starting pectin-containing biomass material comprising an insoluble fiber component and an insoluble protopectin component with an aqueous solution of an alcohol to form a mixture; (B) activating the starting pectin-containing biomass material to form an activated pectin-containing biomass material comprising the insoluble fiber component and a soluble pectin component by subjecting the starting pectin-containing biomass material to (i) an activating solution formed by adding acid to the mixture to adjust the pH of the mixture within the range from at or about 0.5 to at or about 2.5 and (ii) heat to a temperature greater than at or about 40 degrees Celsius; and (C) applying mechanical energy either (i) to the mixture of step A), (ii) during the activating of step B), or (iii) to the mixture of step A) and during the activating of step B); and (D) separating the activated pectin-containing biomass material from the mixture; wherein during the method the alcohol present in the mixture is at or greater than about 40 weight percent based on the total weight of the mixture.

Activated pectin-containing biomass compositions are also provided comprising an insoluble fiber component of cellulosic material and a soluble pectin component. When produced from citrus fruit as the starting pectin-containing biomass material, the activated pectin-containing biomass compositions have a coil overlap parameter of at or about 2 or greater.

BRIEF DESCRIPTION OF THE FIGURES

The accompanying drawings illustrate presently exemplary embodiments of the disclosure and serve to explain, by way of example, the principles of the disclosure.

DETAILED DESCRIPTION

Figure 1:
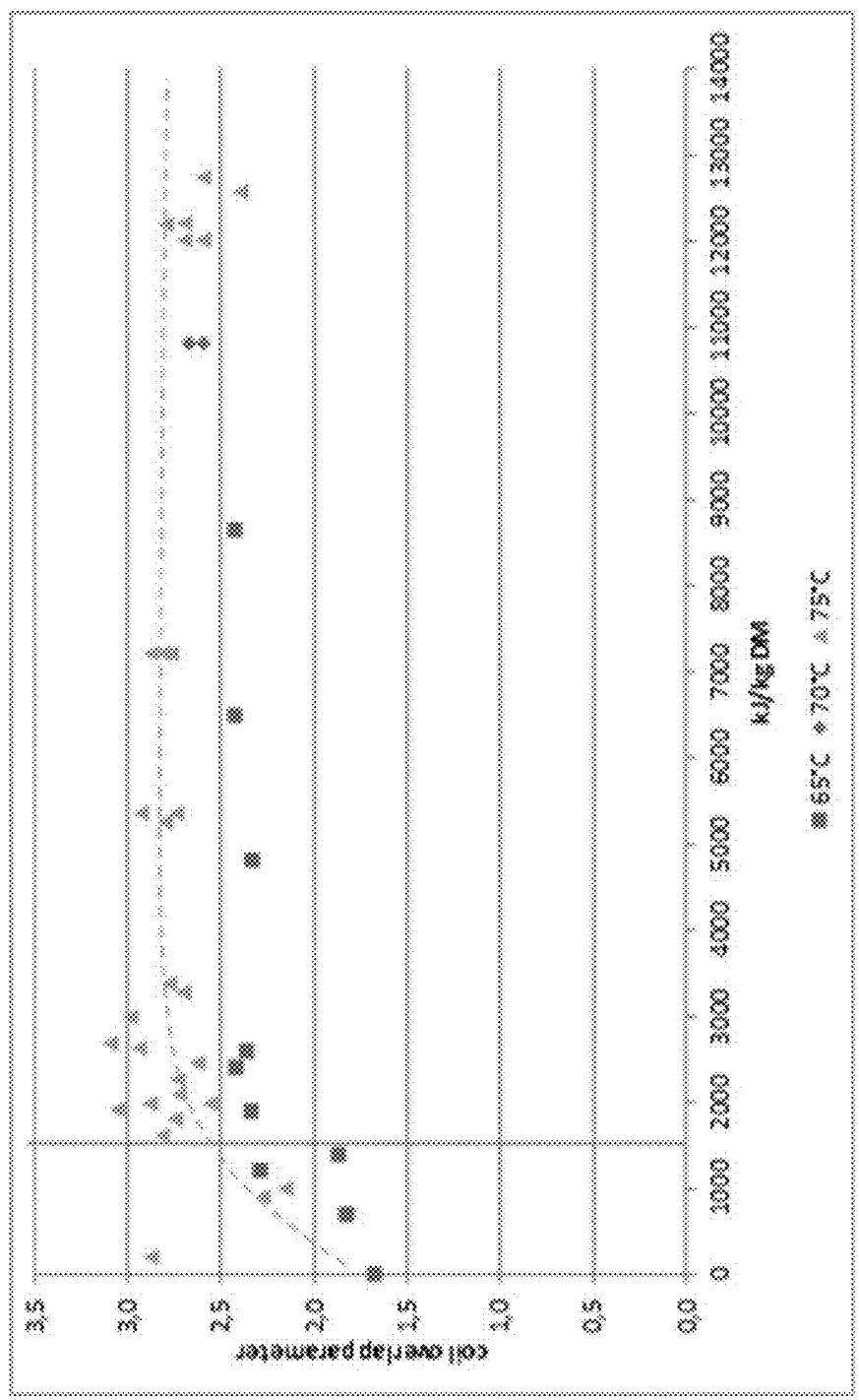
FIG. 1 is a diagrammatic illustration of a graph with data plotted from energy Table 1 according to an exemplary embodiment of the present disclosure.

Activated pectin-containing biomass compositions described herein include an insoluble fiber component and a soluble pectin component. The activated pectin-containing biomass compositions are derived from starting pectin-containing biomass material (i) that is combined with an activating solution and subjected to heat of greater than at or about 40 degrees Celsius for activation and (ii) to which mechanical energy is applied either before activation, during activation or in both instances; wherein throughout the method the alcohol is present in the mixture at or greater than about 40 weight percent based on the total percent of the mixture. This results in improved processing and functionality as compared to pectin-containing biomass compositions derived from starting pectin-containing biomass material without being subjected to activation and mechanical energy.

Much of the pectin in the starting pectin-containing biomass material is in the form of protopectin (i.e., insoluble pectin having a very high degree of esterification (DE) that is unavailable) that must be hydrolyzed to become functional. By mixing a starting pectin-containing biomass material with an activating solution containing alcohol and acid and applying heat (i.e. activating or activation), the protopectin can be hydrolyzed without degrading or extracting the resulting pectin, and therefore results in an activated pectin-containing biomass composition having significantly more soluble pectin than would otherwise be available using conventional methods. Furthermore, applying mechanical energy to the starting pectin-containing biomass material, either before or during contact with the activating solution or in both instances, has been found to advantageously enable a greater amount of protopectin to be hydrolyzed and therefore results in the formation of greater amounts of water soluble pectin. The pectin-containing biomass compositions comprise a soluble pectin component with improved functionality, such as higher intrinsic viscosity and higher pectin yield, and an insoluble fiber component with improved functionality, such as higher water binding capacity.

Activated Pectin-Containing Biomass Compositions

The properties of the activated pectin-containing biomass composition may be characterized by the coil overlap parameter of the composition, which is a means to evaluate the quality and quantity of the pectin within the activated pectin-containing biomass composition. That is, the coil overlap parameter may be used to indicate the functionality of the activated pectin-containing biomass composition. As used herein, the coil overlap parameter is determined by the following formula:

$$\text{Coil Overlap Parameter} = IV_{pectin} \times \text{Pectin Recovery},$$

wherein the $IV_{pectin}$ is the intrinsic viscosity of the pectin extracted from the activated pectin-containing biomass composition, and the pectin recovery is the amount of pectin extracted from the activated pectin-containing biomass composition divided by the total amount of activated pectin-containing biomass composition. Thus, the unit of coil overlap parameter is dl/g. The intrinsic viscosity and pectin recovery of the pectin each may be measured using any suitable method, such as for example, the methods as described herein.

The activated pectin-containing biomass composition can have a coil overlap parameter of at or about 2 or greater, particularly when using citrus fruit as the starting pectin-containing biomass material. The activated pectin-containing biomass composition can have a coil overlap parameter from at or about 2 to at or about 4.5. The activated pectin-containing biomass composition can have a coil overlap parameter from at or about 2.5 to at or about 4.5. The activated pectin-containing biomass composition can have a coil overlap parameter from at or about 3.5 to at or about 4.5. The activated pectin-containing biomass composition can have a coil overlap parameter from at or about 4.0 to at or about 4.5. Further, the activated pectin-containing biomass composition can have a coil overlap parameter of 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4.0, 4.1, 4.2, 4.3, 4.4, 4.5, 4.6, or 4.7. The activated pectin-containing biomass composition of this disclosure may have a coil overlap parameter value between any of these recited coil overlap parameter values.

When the activated pectin-containing biomass composition is derived from other pectin-containing materials such as apples, Jerusalem artichokes or beets, the coil overlap parameter varies according to the amount of natural protopectin available for conversion to soluble pectin. The activated pectin-containing biomass composition when using a starting pectin biomass material selected from apple, Jerusalem artichoke or beet can have a coil overlap parameter within the range of at or about 0.5 to at or about 2.0. Further the activated pectin-containing biomass composition can have at least about 300 percent greater than that of a coil overlap parameter of the starting pectin-containing biomass material.

The activated pectin-containing biomass composition can have an apparent viscosity from at or about 150 mPa·s to at or about 3500 mPa·s when measured in aqueous solution at a temperature of 25° C. and pH 4.0 using a Brookfield Viscometer as disclosed in Protocol 2 herein, particularly when using citrus fruit as the starting pectin-containing biomass material. The apparent viscosity can be from at or about 250 mPa·s to at or about 3100 mPa·s, from at or about 350 mPa·s to at or about 3100 mPa·s, from at or about 500 mPa·s to at or about 3100 mPa·s, from at or about 600 mPa·s to at or about 3100 mPa·s, from at or about 800 mPa·s to at or about 3100 mPa·s, from at or about 1000 mPa·s to at or about 3100 mPa·s, from at or about 1200 mPa·s to at or about 3100 mPa·s, from at or about 1500 mPa·s to at or about 3100 mPa·s, from at or about 2000 mPa·s to at or about 3100 mPa·s, and from at or about 2500 mPa·s to at or about 3100 mPa·s. The activated pectin-containing biomass composition of this disclosure also may have an apparent viscosity between any of these recited viscosity values.

The activated pectin-containing biomass composition can have a water binding capacity from at or about 14 g/g to at or about 27 g/g. The activated pectin-containing biomass composition can have a water binding capacity from at or about 18 g/g to at or about 27 g/g. The water binding capacity of the activated pectin-containing composition can be from at or about 20 g/g to at or about 27 g/g.

The activated pectin-containing biomass composition can have a pH of at least at or about 2.5. For example, the activated pectin-containing biomass composition may have a pH from at or about 2.5 to at or about 5.5, from at or about 2.6 to at or about 5.0, from at or about 2.7 to at or about 4.5, or from at or about 3.5 to at or about 4.5.

By activating the starting pectin-containing biomass material to become the activated pectin-containing biomass composition, protopectin can be converted to its readily soluble form of pectin in situ. The methods as described below do not remove the natural pectic substances present in the starting pectin-containing biomass material. In some variations, substantially no pectin is extracted from the starting pectin-containing biomass material of the mixture during the activating step. As used herein, "substantially no pectin is extracted" means that less than 1% of the pectin in the starting pectin-containing biomass material is removed during the activating step. Not wishing to be bound by any theory, it is believed that the use of the alcohol during the activating step prevents the pectin from leeching out of the starting pectin-containing biomass material, thereby allowing for a greater amount of pectin to be recovered—i.e., improve pectin yield. This results in an activated pectin-containing biomass composition that is not only highly functional, but also closer to nature, resulting in a minimally processed product.

The pectin component can be present in the activated pectin-containing biomass composition in an amount from at or about 20% to at or about 45% by weight of the activated pectin-containing biomass composition. The pectin component can be present in an amount from about 30% to about 45% by weight of the activated pectin-containing biomass composition. The pectin can be present in an amount from at or about 40% to at or about 45% by weight of the activated pectin-containing biomass composition. The pectin component can be present in an amount of about 20%, about 25%, about 30%, about 35%, about 40%, or about 45% by weight of the activated pectin-containing biomass composition. Further, the pectin component may also be present in the activated pectin-containing biomass composition of this disclosure at an amount in a range between any of these recited values.

The activated pectin-containing biomass composition has a residual sugar content as measured in Protocol 4 of less than about 30% by weight of the activated pectin-containing biomass composition. Using a starting pectin-containing biomass material that has been alcohol washed, as further described below, washes out the sugar and improves therefore the quantity and quality of the pectin component in the activated pectin-containing biomass material. The residual sugar content can be from about 3% to about 30% by weight of the activated pectin-containing biomass composition. The residual sugar content can be about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 21%, about 22%, about 23%, about 24%, about 25%, about 26%, about 27%, about 28%, about 29%, or about 30%. Further, the activated pectin-containing biomass composition of this disclosure may also have a residual sugar content value between any of these recited residual sugar content values.

The activated pectin-containing biomass composition can be dried into a dry particulate form. This dry particulate form can be milled, which turns the activated pectin-containing biomass composition into a powder form suitable for handling, for example adding to a food product.

The activated pectin-containing biomass composition may not be dried, but be present undissolved in the mixture in which the material was activated. Such would typically but not always be utilized when pectin within the activated pectin-containing biomass composition were to be extracted. Such extraction can be made by separating the alcohol and more or less water from the activated pectin-containing biomass composition. The separated alcohol may be re-used in subsequent production of activated pectin-containing biomass compositions. Alternatively, the activated pectin-containing biomass composition may be extracted without separating alcohol and more or less water from the activated pectin-containing biomass composition.

Methods

In one or more exemplary embodiments, methods produce activated pectin-containing biomass compositions with various characteristics as described above. One technical effect of the methods is that the resulting activated pectin-containing biomass composition has an insoluble fiber component with a fibrous open network structure and a pectin component in situ of a high quality and a high content. The method produces an activated pectin-containing biomass composition from a starting pectin-containing biomass material. The method comprises the following steps: A) mixing a starting pectin-containing biomass material comprising an insoluble fiber component and an insoluble protopectin component with an aqueous solution of an alcohol to form a mixture; B) activating the starting pectin-containing biomass material to form an activated pectin-containing biomass material comprising the insoluble fiber component and a soluble pectin component by subjecting the starting pectin-containing biomass material to (i) an activating solution formed by adding acid to the mixture to adjust the pH of the mixture within the range from at or about 0.5 to at or about 2.5 and (ii) heat to a temperature greater than at or about 40 degrees Celsius; C) applying mechanical energy either (i) to the mixture of step A), (ii) during the activating of step B), or (iii) to the mixture of step A) and during the activating of step B); and D) separating the activated pectin-containing biomass composition from the mixture; wherein during the method the alcohol present in the mixture is at or greater than about 40 weight percent based on the total weight of the mixture.

The starting pectin-containing biomass material is a non-activated pectin-containing biomass material that includes an insoluble fiber component and insoluble protopectin (i.e. pectin in its insoluble form). Non-limiting examples of pectin-containing biomass material include citrus fruit and/or its peel (such as orange, lemon, lime, grapefruit, pomelo, oroblanco and tangerine), apple pomace, grape pomace, pear pomace, quince pomace, fodder beet, sugar beet, sugar beet residue from sugar extraction, sunflower residue from oil extraction, potato residue from starch production, Jerusalem artichokes, pineapple peel and core, chicory roots, and other pectin-containing biomass materials. The insoluble fiber component generally includes, for example, predominantly cellulosic fibers such as hemicellulose and cellulose.

The starting pectin-containing biomass material can be cleaned and prepared for use by contact and washing with water ("water washed") according to traditional method used for making water washed material. This method involves taking, for example, fresh and cut citrus peel and washing it with 2-3 volumes of water. This operation may be performed 1-4 times after which the resulting water washed peel is mechanically pressed.

The starting pectin-containing biomass material can be cleaned and prepared for use by contact and washing with alcohol ("alcohol washed"). The alcohol washed starting pectin-containing biomass material can be prepared using the processes, in full or in part, as described in U.S. Pat. No. 8,323,513 which is incorporated herein by reference. It is believed that the protopectin present in the starting pectin-containing biomass material may bind water, thereby making removal of water difficult. Treating (i.e. washing) starting pectin-containing biomass material with alcohol has been found to cause the protopectin in situ to lose its water binding ability, which results in water leaching out of the starting pectin-containing biomass material without the protopectin, and therefore ultimately increasing pectin yield.

Non-limiting examples of suitable alcohols include ethanol, isopropanol, methanol, and combinations thereof. The alcohol may be present in the wetting composition in an amount from about 40 to about 85% by weight of the wetting composition or at least about 70% by weight of the wetting composition. The wetting composition may also include water in addition to alcohol, which may constitute all or substantially the remainder of the wetting composition in addition to the alcohol.

When the starting pectin-containing biomass material is alcohol washed, after each wash, the starting pectin-containing biomass material may be mechanically separated from at least a portion of the alcohol-containing wetting composition to form an alcohol washed starting pectin-containing biomass material. The mechanical separation may be done by pressing the wetted starting pectin-containing biomass material, which may be carried out by any suitable pressing device, such as a single screw press-type, or by hand. The pressure during pressing may range from about 0.5 bar to about 8 bar or from about 2 bar to about 4 bar and the duration of pressing may range from about 1 minute to about 25 minutes, or about 10 minutes to about 25 minutes, or about 15 minutes to about 25 minutes.

The starting pectin-containing biomass material may undergo only one alcohol wash, followed by mechanical separation to form an alcohol washed starting pectin-containing biomass material. The starting pectin-containing biomass material may undergo more than one alcohol wash and corresponding mechanical separation to form an alcohol washed starting pectin-containing biomass material. The starting pectin-containing biomass material may undergo a first alcohol wash and corresponding mechanical separation, and thereafter undergo a second alcohol wash and corresponding mechanical separation to form an alcohol washed starting pectin-containing biomass material.

The starting pectin-containing biomass material may optionally be dried by exposure to heat to form a dried starting pectin-containing biomass material.

In step A), the starting pectin-containing biomass material whether water washed or alcohol washed or wet or dry can be mixed with an aqueous solution of an alcohol to form a mixture wherein the alcohol present in the mixture is at or greater than about 40 weight percent based on the total weight of the mixture. In step A), the alcohol may be present in the mixture in an amount of at or about 40 to at or about 60 weight percent alcohol. The amount of alcohol to be added or diluted may be calculated by one of ordinary skill in the art depending on the amount of water present in the water washed starting pectin-containing biomass material and depending on the amount of alcohol and water present in the alcohol washed starting pectin-containing biomass material.

Prior to the activating in step B), the starting pectin-containing biomass material comprises the insoluble fiber component and insoluble protopectin component. When the starting pectin-containing biomass material is in contact with the activating solution, the protopectin hydrolyzes in situ to yield water soluble pectin within the starting pectin-containing biomass material, thereby resulting in an activated pectin-containing biomass composition including the insoluble fiber component and the soluble pectin component. It is believed that the protopectin covert to water soluble pectin through the action of the acid and, due to the alcohol, does so without leaching out of the starting pectin containing biomass material. As a result, pectin yield may be improved.

The activating solution comprising an alcohol and an acid and may be formed by adding acid to the mixture of step A) to adjust the pH of the mixture within the range from at or about 0.5 to at or about 2.5. Thus, the activating solution can have a pH of about 0.5 to about 2.5 or of about 1.0 to about 2.0. Non-limiting examples of suitable alcohols include isopropyl alcohol, ethanol, methanol, and combinations thereof. Non-limiting examples of suitable acids include organic and inorganic acids such as nitric acid, citric acid, oxalic acid, hydrochloric acid, sulfuric acid, phosphoric acid, and combinations thereof. The alcohol may be a solution may of about 40% to about 80% alcohol, such as ethanol, and the acid may be a solution of about 10% to about 65% nitric acid, in order to provide a pH of the mixture within the range from about 0.5 to about 2.5. A 10% solution of nitric acid is preferred for safety reasons.

The time period the starting pectin-containing biomass material is in contact with an activating solution will vary depending at least in part on the types of alcohol and acids used, the temperature at which the mixture is heated, and whether or not mechanical energy is applied in step B and to the intensity of the mechanical energy applied. For example, the starting pectin-containing biomass material may be contacted with the activating solution for a period of at least about 5 minutes to at or about 2 hours. The starting pectin-containing biomass material may be contacted with the activating solution for a period of at or about 15 minutes to at or about 1 hour. Further, step B) may be conducted for a period of 5, 10, 15, 20, 25, 30, 35, 40, 45, 50, 55 minutes or 1 hr, 1.1 hr, 1.2 hr, 1.25 hr, 1.3 hr, 1.4 hr, 1.5 hr, 1.6 hr, 1.7 hr, 1.75 hr, 1.8 hr, 1.9 hr, and 2 hr. The mixture can be heated for a period of time that is between any of these recited values.

The activating step B) includes heating the mixture of the starting pectin-containing biomass material and the activating solution to a temperature that is greater than at or about 40 degrees Celsius (° C.). The mixture can be heated to a temperature from at or about 40° C. to at or about 90° C. The mixture can be heated to a temperature that is from at or about 60° C. to at or about 75° C. The mixture can be heated to a temperature of at or about one of 40° C., 45° C., 50° C., 55° C., 60° C., 65° C., 70° C., 75° C., 80° C., 85° C., and 90° C., or mixture can be heated to a temperature that is between any of these recited values.

The mixture throughout its use in the method has a concentration of the starting pectin-containing biomass material limited in accordance with the subsequent mechanical device used for applying the mechanical energy in step C). For a more effective device, the concentration of the starting pectin-containing biomass material can be higher. To simplify, the concentration of the starting pectin-containing biomass material can be based on dry matter of the starting pectin-containing biomass material. The concentration of the starting pectin-containing biomass material can be at or about 1 to at or about 5 weight percent, or can be at or about 2 to at or about 4 weigh percent, can be at or about 3 to at or about 4 weight percent, based on the total weight of the mixture.

The method for producing the activated pectin-containing biomass compositions described herein further includes, as in step C), applying mechanical energy at certain stages of the method. Mechanical energy can be applied to the mixture of step A), which as described above is the starting pectin-containing biomass material in an aqueous solution of alcohol. Mechanical energy can be applied during the activating of step B), which as described above as subjecting the starting pectin-containing biomass material to the activating solution and to heat. Mechanical energy can be applied during both step A and step B). Applying mechanical energy in the method homogenizes the mixture, changes the physical structure of the starting pectin-containing biomass material, increases the coil overlap parameter, and partly allows the cellulose to become micro fibrillated cellulose. The amount of mechanical energy applied in the method depends on at which step applied, the type of starting pectin-containing biomass material, the amount of the starting pectin-containing biomass material used in the mixture, the pH of the mixture, and the temperature of the activating step. The amount of mechanical energy also can influence the amount of time needed to complete the activating of the starting-pectin containing biomass material to form the activated pectin-containing biomass material.

Devices for applying mechanical energy can be a pump, a refiner, an extruder, a lobe pump, and/or a centrifugal pump. The mixture can be circulated in a closed-loop system that includes a pressure vessel (able to contain a heated solvent mixture), a reflux vessel, a heat exchanger, such as a shell and tube heat exchanger, and a pump for recirculating the heated mixture back to the vessel, allowing multiple passes through the pump in the system. Any pump that can exert a mechanical energy, such as a bi-axial extensional stress, on the fluid as it passes through the pump or through the system can be used. Examples include rotary lobe pumps (available from, e.g., Viking Pump, Inc., Cedar Falls, Iowa; Johnson Pump, Rockford, Ill.; and Wright Flow Technologies, Inc., Cedar Falls, Iowa); centrifugal pumps, and hydrotransport pumps (available from, e.g., Cornell Pump Company, Clackamas, Oreg.; and Alfa Laval Inc., Richmond. Va.). Other devices that can be used singularly or in combination to impart mechanical energy, such as a bi-axial extensional stress, include a plate refiner, a disc refiner, a conical refiner, a hydrapulper, an extruder, a friction grinder mill, a hammer mill, and a ball mill. Steam explosion or pressure relief also can be used to impact mechanical energy. The methods can be designed as continuous without circulating back to the pressure vessel.

The pump can be a rotary lobe pump, alone or in combination with another type of pump. The rotary lobe pump is a positive displacement pump and can have a single lobe, bi-wing, tri-lobe, or multi-lobe configuration. During operation, two rotors mesh together and rotate in opposite directions, forming cavities between the rotors and the housing of the pump. The mixture enters and fills the cavities, moving through the pump between the lobes and the casing. The movement of the lobes of the pump forces the mixture through the outlet port of the discharge side of the pump and the mixture is ejected from the pump. The movement of the mixture through the pump exposes the mixture to mechanical energy, which teases apart the cellulosic fibers at least partially into fibrils. The mechanical energy can include a bi-axial extensional stress. The lobe pump can continuously pump the mixture through the heat exchanger and back to the tank or pressure vessel for a set time. The methods can be designed as continuous without circulating back to the tank or pressure vessel.

This mechanical energy imparted, such as by the action by the pump, which can induce turbulent flow within the pump and within the starting pectin-containing biomass material as it is circulated through the closed-loop system or through the continuous process, opens the structure of the cellulosic component, visually changing the physical structure of the material as it takes on a more "fluffy" or "cotton-like" appearance when examined during the process. Turbulent flow leads to flow reversals and thus extension of the starting pectin-containing biomass material within the mixture. The mechanical energy fibrillates at least a portion of the cellulosic fiber into fibrils, increasing the surface area and thus the efficacy of the activating step.

The application of the mechanical energy can transform the starting pectin-containing biomass material in the mixture to its fibrous structure creating an open network allowing more access of the activating solution to the protopectin so that the protopectin is converted to soluble pectin within the fibrous structure. In one example, substantially all the pectin becomes readily water soluble, even in cold water. The micro fibrillated cellulose can be in particulate form and can have a characterizing length in the range of at or about $1\times10^{-6}$ meters to at or about $5000\times10^{-6}$ meters, at or about $100\times10^{-6}$ meters to at or about $3000\times10^{-6}$ meters, at or about $500\times10^{-6}$ meters to at or about $3000\times10^{-6}$ meters, or at or about $1000\times10^{-6}$ meters to at or about $3000\times10^{-6}$ meters.

Mechanical energy as used herein is defined either in kilojoules (kJ) per kilogram dry matter (DM) in the mixture or as kilojoules per kilogram of the mixture (i.e. the slurry containing the starting pectin-containing biomass material. Specifying the energy input per kg dry matter is independent of the total weight of the mixture being pre-treated and activated. The amount of mechanical energy applied can be at or about 800 kilojoules or greater per kg dry matter, or in the range of from at or about 800 to at or about 15,000 kJ/kg dry matter. The mechanical energy to which the mixture can be subjected can be at least any one of 800 kJ/kg, 1,000 kJ/kg, 1,200 kJ/kg, 1,400 kJ/kg, 1,600 kJ/kg, 1,800 kJ/kg, 2,000 kJ/kg, 2,200 kJ/kg, 2,400 kJ/kg, 2,600 kJ/kg, 2,800 kJ/kg, 3,000 kJ/kg, 3,200 kJ/kg, 3,400 kJ/kg, 3,600 kJ/kg, 3,800 kJ/kg, 4,000 kJ/kg, 4,200 kJ/kg, 4,400 kJ/kg, 4,600 kJ/kg, 4,800 kJ/kg, 5,000 kJ/kg, 5,200 kJ/kg, 5,400 kJ/kg, 5,600 kJ/kg, 5,800 kJ/kg, 6,000 kJ/kg, 6,200 kJ/kg, 6,400 kJ/kg, 6,800 kJ/kg, 7,000 kJ/kg, 7,200 kJ/kg, 7,400 kJ/kg, 7,600 kJ/kg, 7,800 kJ/kg, 8,000 kJ/kg, 8,200 kJ/kg, 8,400 kJ/kg, 8,600 kJ/kg, 8,800 kJ/kg, 9,000 kJ/kg, 9,200 kJ/kg, 9,400 kJ/kg, 9,600 kJ/kg, 9,800 kJ/kg, 10,000 kJ/kg, 10,200 kJ/kg, 10,400 kJ/kg, 10,600 kJ/kg, 10,800 kJ/kg, 11,000 kJ/kg, 11,200 kJ/kg, 11,400 kJ/kg, 11,600 kJ/kg, 11,800 kJ/kg, 12,000 kJ/kg, 12,200 kJ/kg, 12,400 kJ/kg, 12,600 kJ/kg, 12,800 kJ/kg, 13,000 kJ/kg, 13,200 kJ/kg, 13,400 kJ/kg, 13,600 kJ/kg, 13,800 kJ/kg, 14,000 kJ/kg, 14,200 kJ/kg, 14,400 kJ/kg, 14,600 kJ/kg, 14,800 kJ/kg, or 15,000 kJ/kg, or the mixture can be subjected to a mechanical energy in the range of from at or about a to at or about b, where a is any one of the preceding mechanical energy values and b is any one of the preceding mechanical energy values that is >a, such as from at or about 1,400 kJ/kg to at or about 7,900 kJ/kg, or at or about 1,300 kJ/kg to at or about 14,400 kJ/kg, etc. For example, for 1 kg material (dry weight basis) in 30 liters of acidified aqueous alcohol processed through a lobe pump (APV type, CL/1/021/10) with a pump motor that is 2 kW at 50 Hz that operated at 10 Hz (0.4 kW) for a period of 50 minutes (3000 seconds), the energy imparted to the sample was 0.4 kW×3000 seconds or 1200 kilojoules (per kg dry matter). Mechanical energy for the mixture can be at or about 36 kilojoules greater per kilogram of the mixture, at or about 40 kilojoules greater per kilogram of the mixture, or at or about 60 kilojoules greater per kilogram of the mixture.

The mechanical energy input per kilogram dry matter or per kilogram of the mixture depends on the mechanical device. Energy input may be based on the motor size of the pumps, or similar device used, taking into account the use of frequency inverter, amperes, and voltages. For example, when using a lobe pump having a frequency in the range 10-40 Hz, and an effect in the range 0.4-1.6 kW, circulating the mixture through the lobe pump 20-156 passes, corresponds to the mechanical energy input is in the range 800-8600 kJ. With such a lobe pump, the number of passes through the pump can be 20-50 passes, which corresponds to a mechanical energy input of 800-2400 kJ. This exemplary embodiment is used when the starting pectin-containing biomass material is citrus peel.

Figure 2:
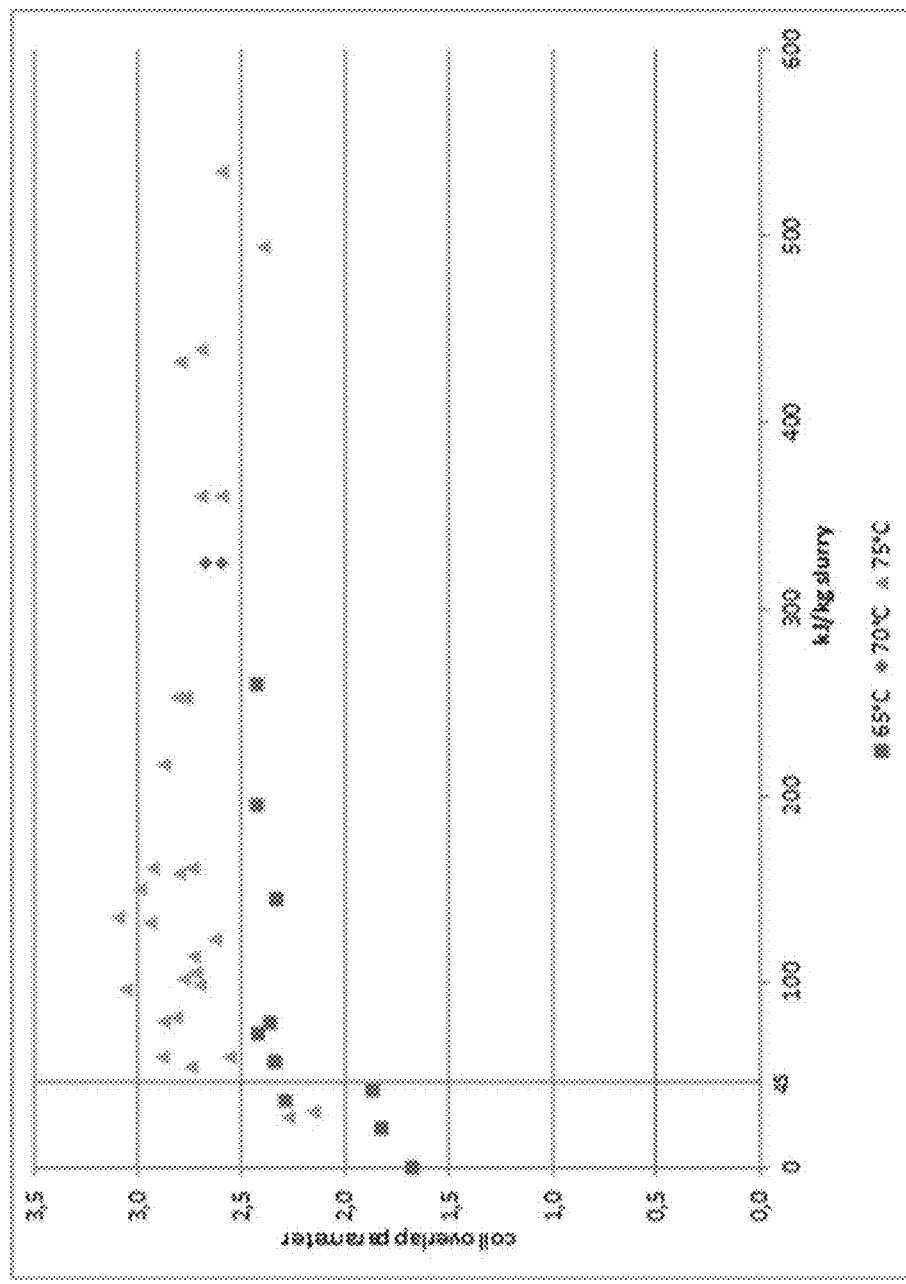
FIG. 2 is a diagrammatic illustration of a graph with data plotted from energy Table 2 according to an exemplary embodiment of the present disclosure.

Tables 1-2 and the graph of the values of the coil overlap parameters and the mechanical energy in FIGS. 1-2 are examples of the effect of the mechanical energy when added to step A) noted below as pre-treatment and/or to step B) noted below as activation. In these examples the following devices were used to add energy: a small lobe pump (2 kW); a big lobe pump (5.5 kW); a lobe pump (2.2 kW); a centrifugal pump (7.5 kW); a Boston Shear Mill (11 kW); an extruder (8 kW); and a refiner (8 kW). The exemplary amounts were 1 kg dry matter (DM) in a 30 kg mixture and about 20 kg dry matter in approximate 360 kg mixture. A dilution of the starting pectin-containing biomass material with alcohol before pre-treatment may be done in order to be able to pump the material. When the starting pectin-containing biomass material is alcohol washed, the pre-treatment can be done without addition of alcohol such as when pumping is not an issue with the type of equipment used. The dilution with alcohol can be in the activation step only. When the starting pectin-containing biomass material is not diluted (e.g. using alcohol washed citrus peel), the pre-treatment may require less energy input.

To calculate the mechanical energy properties in Table 1, the following example calculations can be used:

1) A lobe pump has a 2 kW motor at 50 Hertz, but is operating only at 10 Hertz giving an effect of 0.4 kW. The lobe pump is working 30 minutes (1800 sec) which means that the mechanical energy is: 0.4 kW*1800 sec=720 kJ. The slurry being recirculated contains 1 kg dry matter (DM) so the specific energy is 720 kJ/kg DM. The total slurry volume is 30 kg. The pump running at 10 Hertz gives a flow of 860 kg/hr, so the total slurry through the pump in 30 minutes is 430 kg. The slurry has then has 430 kg/30 kg=14.3 passes.

2) A lobe pump has a 2 kW motor at 50 Hertz and is operating at this frequency. The lobe pump is working 60 minutes (3600 sec) which means that the mechanical energy is: 2 kW*3600 sec=7200 kJ. The slurry being recirculated contains 1 kg dry matter (DM) so the specific energy is 7200 kJ/kg DM. The total slurry volume is 30 kg. The pump running at 50 Hertz gives a flow of 4300 kg/hr, so the total slurry through the pump in 60 minutes is 4300 kg. The slurry has then had 4300 kg/30 kg=143 passes.

TABLE 1

| Sample | Dry matter (kg) | Pre-treatment device | Total mixture (kg) | Pre-treatment energy (kJ) | Pre-treatment specific energy (kJ/kg DM) | Pre-treatment specific energy mixture (kJ/kg mixture) | Activation Device | Total slurry (kg) | Activation energy (kJ) | Activation specific energy DM (kJ/kg DM) | Activation specific energy mixture (kJ/kg mixture) | Total specific energy DM (kJ/kg DM) | Total specific energy mixture (kJ/kg mixture) |
|---|---|---|---|---|---|---|---|---|---|---|---|---|---|
| 1 | 1 | BSM | 30 | 1386 | 1386 | 46.2 | Small lobe | 30 | 1200 | 1200 | 40.0 | 2586 | 86.2 |
| 2 | 1 | BSM | 30 | 1386 | 1386 | 46.2 | None | 30 | 0 | 0 | 0.0 | 1386 | 46.2 |
| 3 | 1 | BSM | 30 | 693 | 693 | 23.1 | Small lobe | 30 | 1200 | 1200 | 40.0 | 1893 | 63.1 |
| 4 | 1 | BSM | 30 | 693 | 693 | 23.1 | None | 30 | 0 | 0 | 0.0 | 693 | 23.1 |
| 5 | 1 | None | 30 | 0 | 0 | 0.0 | Small lobe | 30 | 1200 | 1200 | 40.0 | 1200 | 40.0 |
| 6 | 1 | None | 30 | 0 | 0 | 0.0 | Small lobe | 30 | 2400 | 2400 | 80.0 | 2400 | 80.0 |
| 7 | 1 | None | 30 | 0 | 0 | 0.0 | Small lobe | 30 | 4800 | 4800 | 160.0 | 4800 | 160.0 |
| 8 | 1 | None | 30 | 0 | 0 | 0.0 | None | 30 | 0 | 0 | 0.0 | 0 | 0.0 |
| 9 | 1 | None | 30 | 0 | 0 | 0.0 | Small lobe | 30 | 8640 | 8640 | 288.0 | 8640 | 288.0 |
| 10 | 1 | None | 30 | 0 | 0 | 0.0 | Small lobe | 30 | 6480 | 6480 | 216.0 | 6480 | 216.0 |
| 11 | 1 | None | 30 | 0 | 0 | 0.0 | Small lobe | 30 | 10800 | 10800 | 360.0 | 10800 | 360.0 |
| 12 | 1 | None | 30 | 0 | 0 | 0.0 | Small lobe | 30 | 10800 | 10800 | 360.0 | 10800 | 360.0 |
| 13 | 1 | None | 30 | 0 | 0 | 0.0 | Small lobe | 30 | 1800 | 1800 | 60.0 | 1800 | 60.0 |
| 14 | 1 | None | 30 | 0 | 0 | 0.0 | Small lobe | 30 | 7200 | 7200 | 240.0 | 7200 | 240.0 |
| 15 | 1 | None | 30 | 0 | 0 | 0.0 | Small lobe | 30 | 7200 | 7200 | 240.0 | 7200 | 240.0 |
| 16 | 1 | None | 30 | 0 | 0 | 0.0 | Small lobe | 30 | 7200 | 7200 | 240.0 | 7200 | 240.0 |
| 17 | 20 | Refiner | 360 | 2400 | 120 | 6.7 | Lobe + centrifugal | 360 | 21420 | 1071 | 59.5 | 1191 | 66.2 |
| 18 | 20 | Refiner | 360 | 2400 | 120 | 6.7 | Lobe + centrifugal | 360 | 42840 | 2142 | 119.0 | 2262 | 125.7 |
| 19 | 20 | Refiner | 360 | 9600 | 480 | 26.7 | Lobe + centrifugal | 360 | 32130 | 1606.5 | 89.3 | 2087 | 115.9 |
| 20 | 20 | Refiner | 360 | 9600 | 480 | 26.7 | Lobe + centrifugal | 360 | 42840 | 2142 | 119.0 | 2622 | 145.7 |

TABLE 1-continued

| Sample | Dry matter (kg) | Pre-treatment device | Total mixture (kg) | Pre-treatment energy (kJ) | Pre-treatment specific energy (kJ/kg DM) | Pre-treatment specific energy mixture (kJ/kg mixture) | Activation Device | Total slurry (kg) | Activation energy (kJ) | Activation specific energy DM (kJ/kg DM) | Activation specific energy mixture (kJ/kg mixture) | Total specific energy DM (kJ/kg DM) | Total specific energy mixture (kJ/kg mixture) |
|---|---|---|---|---|---|---|---|---|---|---|---|---|---|
| 21 | 20 | Refiner | 360 | 16800 | 840 | 46.7 | Lobe + centrifugal | 360 | 21420 | 1071 | 59.5 | 1911 | 106.2 |
| 22 | 20 | Refiner | 360 | 16800 | 840 | 46.7 | Lobe + centrifugal | 360 | 32130 | 1606.5 | 89.3 | 2447 | 135.9 |
| 23 | 20 | Refiner | 360 | 16800 | 840 | 46.7 | Lobe + centrifugal | 360 | 42840 | 2142 | 119.0 | 2982 | 165.7 |
| 24 | 20 | None | 360 | 0 | 0 | 0.0 | Lobe + centrifugal | 360 | 32130 | 1606.5 | 89.3 | 1607 | 89.3 |
| 25 | 20 | None | 360 | 0 | 0 | 0.0 | Lobe + centrifugal | 360 | 53550 | 2677.5 | 148.8 | 2678 | 148.8 |
| 26 | 1 | None | 30 | 0 | 0 | 0.0 | Big lobe | 30 | 990 | 990 | 33.0 | 990 | 33.0 |
| 27 | 1 | None | 30 | 0 | 0 | 0.0 | Big lobe | 30 | 1980 | 1980 | 66.0 | 1980 | 66.0 |
| 28 | 1 | None | 30 | 0 | 0 | 0.0 | Big lobe | 30 | 3366 | 3366 | 112.2 | 3366 | 112.2 |
| 29 | 1 | None | 30 | 0 | 0 | 0.0 | Big lobe | 30 | 5346 | 5346 | 178.2 | 5346 | 178.2 |
| 30 | 1 | None | 30 | 0 | 0 | 0.0 | Big lobe | 30 | 5346 | 5346 | 178.2 | 5346 | 178.2 |
| 31 | 1 | None | 30 | 0 | 0 | 0.0 | Big lobe | 30 | 891 | 891 | 29.7 | 891 | 29.7 |
| 32 | 1 | None | 30 | 0 | 0 | 0.0 | Big lobe | 30 | 1980 | 1980 | 66.0 | 1980 | 66.0 |
| 33 | 1 | None | 30 | 0 | 0 | 0.0 | Big lobe | 30 | 3267 | 3267 | 108.9 | 3267 | 108.9 |
| 34 | 1 | None | 30 | 0 | 0 | 0.0 | Big lobe | 30 | 5247 | 5247 | 174.9 | 5247 | 174.9 |
| 35 | 1 | None | 4.2 | 0 | 0 | 0.0 | Small lobe | 30 | 12000 | 12000 | 400.0 | 12000 | 400.0 |
| 36 | 1 | Extruder | 4.2 | 725 | 725 | 172.6 | Small lobe | 30 | 12000 | 12000 | 400.0 | 12725 | 572.6 |
| 37 | 1 | Extruder | 4.2 | 556 | 556 | 132.4 | Small lobe | 30 | 12000 | 12000 | 400.0 | 12556 | 532.4 |
| 38 | 1 | none | 2.5 | 0 | 0 | 0.0 | Small lobe | 30 | 12000 | 12000 | 400.0 | 12000 | 400.0 |
| 39 | 1 | Extruder | 2.5 | 180 | 180 | 72.0 | Small lobe | 30 | 12000 | 12000 | 400.0 | 12180 | 472.0 |
| 40 | 1 | Extruder | 2.5 | 196 | 196 | 78.4 | Small lobe | 30 | 12000 | 12000 | 400.0 | 12196 | 478.4 |
| 41 | 1 | Extruder | 2.5 | 196 | 196 | 78.4 | None | 30 | 0 | 0 | 0.0 | 196 | 78.4 |

TABLE 2

| Sample | Total specific energy (kJ/kg DM) | Total specific energy (kJ/kg mixture) | Temp (° C.) | Time Heating (min) | # of Passes | Nitric Acid 62% (mL/kg) | IV (dL/g) | Recovery (%) | Coil overlap parameter |
|---|---|---|---|---|---|---|---|---|---|
| 1 | 2586 | 86.2 | 65 | 50 | 23 | 100 | 8.4 | 28.2 | 2.4 |
| 2 | 1386 | 46.2 | 65 | 200 | 0 | 100 | 9.6 | 19.5 | 1.9 |
| 3 | 1893 | 63.1 | 65 | 50 | 23 | 100 | 8.2 | 28.6 | 2.3 |
| 4 | 693 | 23.1 | 65 | 200 | 0 | 100 | 10 | 18.3 | 1.8 |
| 5 | 1200 | 40.0 | 65 | 50 | 23 | 100 | 8.9 | 25.8 | 2.3 |
| 6 | 2400 | 80.0 | 65 | 50 | 48 | 100 | 8.2 | 29.6 | 2.4 |
| 7 | 4800 | 160.0 | 65 | 50 | 119 | 100 | 9 | 26 | 2.3 |
| 8 | 0 | 0.0 | 65 | 200 | 0 | 100 | 8.8 | 19.1 | 1.7 |
| 9 | 8640 | 288.0 | 65 | 90 | 215 | 100 | 8 | 30.4 | 2.4 |
| 10 | 6480 | 216.0 | 65 | 90 | 42 | 100 | 8 | 30.4 | 2.4 |
| 11 | 10800 | 360.0 | 70 | 90 | 215 | 100 | 6.7 | 38.8 | 2.6 |
| 12 | 10800 | 360.0 | 70 | 90 | 215 | 100 | 7.2 | 37.2 | 2.7 |
| 13 | 1800 | 60.0 | 75 | 15 | 36 | 150 | 7.3 | 37.8 | 2.8 |
| 14 | 7200 | 240.0 | 75 | 60 | 143 | 150 | 6.9 | 42.0 | 2.9 |
| 15 | 7200 | 240.0 | 75 | 60 | 143 | 150 | 6.2 | 44.8 | 2.8 |
| 16 | 7200 | 240.0 | 75 | 60 | 143 | 150 | 6.5 | 43.4 | 2.8 |
| 17 | 1191 | 66.2 | 75 | 60 | 40 | 240 | 6.7 | 46.0 | 3.1 |
| 18 | 2262 | 125.7 | 75 | 120 | 80 | 240 | 5.8 | 45.6 | 2.6 |
| 19 | 2087 | 115.9 | 75 | 90 | 60 | 240 | 6.4 | 46.6 | 3.0 |
| 20 | 2622 | 145.7 | 75 | 120 | 80 | 240 | 6.0 | 46.9 | 2.8 |
| 21 | 1911 | 106.2 | 75 | 60 | 40 | 330 | 6.7 | 46.1 | 3.1 |
| 22 | 2447 | 135.9 | 75 | 90 | 60 | 330 | 5.9 | 46.5 | 2.7 |
| 23 | 2982 | 165.7 | 75 | 120 | 80 | 330 | 5.8 | 47.1 | 2.7 |
| 24 | 1607 | 89.3 | 75 | 90 | 60 | 240 | 7.9 | 39.6 | 3.1 |
| 25 | 2678 | 148.8 | 75 | 150 | 100 | 240 | 7.5 | 39.9 | 3.0 |
| 26 | 990 | 33.0 | 75 | 5 | 15 | 150 | 7.2 | 29.9 | 2.2 |
| 27 | 1980 | 66.0 | 75 | 10 | 31 | 150 | 7.2 | 35.7 | 2.6 |
| 28 | 3366 | 112.2 | 75 | 17 | 52 | 150 | 7.3 | 38.1 | 2.8 |
| 29 | 5346 | 178.2 | 75 | 27 | 83 | 150 | 7.4 | 39.5 | 2.9 |
| 30 | 5346 | 178.2 | 75 | 27 | 83 | 150 | 7.1 | 38.8 | 2.7 |
| 31 | 891 | 29.7 | 75 | 9 | 14 | 150 | 7.4 | 30.8 | 2.3 |
| 32 | 1980 | 66.0 | 75 | 20 | 31 | 150 | 7.4 | 39.0 | 2.9 |
| 33 | 3267 | 108.9 | 75 | 33 | 50 | 150 | 7.1 | 38.4 | 2.7 |
| 34 | 5247 | 174.9 | 75 | 53 | 81 | 150 | 7.1 | 39.4 | 2.8 |

TABLE 2-continued

| Sample | Total specific energy (kJ/kg DM) | Total specific energy (kJ/kg mixture) | Temp (° C.) | Time Heating (min) | # of Passes | Nitric Acid 62% (mL/kg) | IV (dL/g) | Recovery (%) | Coil overlap parameter |
|---|---|---|---|---|---|---|---|---|---|
| 35 | 12000 | 400.0 | 75 | 100 | 239 | 150 | 5.9 | 45.1 | 2.6 |
| 36 | 12725 | 572.6 | 75 | 100 | 239 | 150 | 5.8 | 45 | 2.6 |
| 37 | 12556 | 532.4 | 75 | 100 | 239 | 150 | 5.3 | 45.7 | 2.4 |
| 38 | 12000 | 400.0 | 75 | 100 | 239 | 150 | 6.1 | 45 | 2.7 |
| 39 | 12180 | 472.0 | 75 | 100 | 239 | 150 | 6.2 | 45.1 | 2.8 |
| 40 | 12196 | 478.4 | 75 | 100 | 239 | 150 | 6.2 | 44.4 | 2.7 |
| 41 | 196 | 78.4 | 75 | 60 | 0 | 150 | 6.6 | 43.4 | 2.9 |

With reference to the data in Tables 1-2 and FIGS. 1-2, when the coil overlap parameter is plotted against the mechanical energy inputted, the following may be taken from the graphs. If the energy that is added to the starting pectin-containing biomass material, citrus peel in these examples, is 800 kJ/kg DM or greater or 36 kJ/kg of the mixture, then the coil overlap parameter is 2 or greater. With variations in equipment, temperature, pH and point of applying mechanical energy, the coil overlap parameter is affected. The functionality of the activated pectin-containing biomass material increases with increasing coil overlap parameter. Thus the method can produce an activated pectin-containing biomass material with a coil overlap parameter of at or about 2.3 or greater when using mechanical energy of at or about 1200 kJ/kg DM or greater or at or about 40 kJ/kg mixture and a coil overlap parameter of at or about 2.5 or greater when using mechanical energy at or about 1900 kJ/kg DM or at or about 60 kJ/kg mixture.

Turning for example to sample 1 above, a dilution with alcohol was made before pre-treatment. Amount of dry starting pectin-containing biomass material (alcohol washed)=1 kg (this relates typically to 2.5 kg wet starting pectin containing biomass). Total weight of mixture in pretreatment=30 kg. Energy input in pre-treatment=1386 kilojoules (kJ). Energy input during activation=1200 kJ. Total energy input was energy input in pre-treatment+energy input during activation=2586 kJ. Total specific energy input (based on dry matter)=(total energy input)/(amount of dry starting pectin containing biomass)=2586 kJ/1 kg=2586 kJ/kg DM. Total specific energy input (based on total weight of slurry)=(total energy input)/(total weight of slurry)=2586 kJ/30 kg=86.2 kJ/kg.

Turning for example to sample 40, a dilution with alcohol was made after pre-treatment. Amount of dry starting pectin containing biomass (alcohol washed)=1 kg (this relates typically to 2.5 kg wet starting pectin containing biomass). Total weight of mixture=30 kg. Energy input in pre-treatment=196 kJ. Energy input during activation=12000 kJ. Total energy input=energy input in pre-treatment+energy input during activation=12196 kJ. Total specific energy input (based on dry matter)=(total energy input)/(amount of dry starting pectin containing biomass)=12196 kJ/1 kg=12196 kJ/kg. Total specific energy input (based on total weight of mixture)=(total energy input during pre-treatment)/(total weight of mixture during pre-treatment)+(total energy input during activation)/(total weight of mixture during activation)=196 kJ/2.5 kg+12000 kJ/30 kg=478 kJ/kg.

The method for producing the activated pectin-containing biomass compositions described herein includes separating the activated pectin-containing biomass composition from the mixture, referred to as step D). After activating and applying mechanical energy, the now activated pectin-containing biomass composition and activating solution is separated into a liquid phase comprising the activating solution and a phase comprising the activated pectin-containing biomass composition. The phase containing the activated pectin-containing biomass composition may be further pressed, for example by using a screw press or a decanter centrifuge. The method can include draining, decanting or membrane filtration of the mixture. For example, the mixture can be deposited on a perforated belt or screen to allow the fluid portion of the mixture to drain away. Excess fluid can be removed by application of a pressure, such as by use of a press, such as a hydraulic press, a pneumatic press, a screw press, a Vincent press, or a cone press, or a centrifugal extractor, or any combination thereof, forming a dewatered activated pectin-containing biomass composition.

The activated pectin-containing biomass material composition comprises about 40 weight percent dry matter, and the liquid is composed primarily of alcohol and acid. In order to remove the residual acid, the separating step D) can include washing the activated pectin-containing biomass composition in an aqueous solution of an alcohol containing at or about 40 to at or about 90 weight percent alcohol until the pH of the washing liquid is increased to at or about 3 to at or about 5 or to at or about 3.5 to at or about 4.5. The alcohol wash also can include an alkalizing agent that can neutralize the acid. Non-limiting examples of alcohols that may be used to wash the drained activated pectin-containing composition include isopropyl alcohol, ethanol, methanol, and combinations thereof. Exemplary alkalizing agents include an alkali metal salt of a carbonate, bicarbonate, or hydroxide, such as potassium carbonate, sodium bicarbonate or sodium hydroxide. This washing may be done as a batch process or as a counter current process. The amount of alcohol present in the alcohol wash can be increased in subsequent washes. For example, a first alcohol wash can include an alcohol content of 45 wt %; a second alcohol wash can include an alcohol content of 55 wt %; and a third alcohol wash can include an alcohol content of 70 wt % or more. Using an alcohol wash with an alcohol content of 70 wt % or more as a final washing step can efficiently dewater the activated pectin-containing biomass composition prior to drying. This can reduce the time and temperature required to achieve a dried product with a targeted moisture content. The presence of the alcohol also can help to minimize or prevent hydrogen-bond formation between fibrils of the cellulosic fibers of the activated pectin-containing biomass composition, thereby minimizing or preventing hornification of the cellulosic fibers upon drying. The process can include a series of successive alcohol washes having higher alcohol concentrations to dehydrate the activated fiber.

After the separating step, the activated pectin-containing biomass composition, may then undergo downstream treatments or processing, in-line or off-line. In the case of using the activated pectin-containing biomass composition for extraction, the activated pectin-containing biomass composition can be in the form of an aqueous suspension.

The activated pectin-containing biomass composition can be dried such that the activated pectin-containing biomass composition is in a dry form. The temperature during drying must be controlled such that the temperature of the activated pectin-containing biomass composition does not exceed about 75-80 degrees Celsius in order not to impact the quality of the activated pectin-containing biomass composition. Exemplary non-limiting drying methods include using mechanical separation techniques to express water from the fibers, solvent exchange to displace residual water, such as by washing with an organic solvent solution, freeze drying, vacuum drying, spray drying, drum drying, drying with heat, drying with an air flow, flash drying, fluidized bed drying, exposure to radiant heat and combinations thereof. A drying agent can be included in the drying process to further inhibit cellulosic to cellulosic interactions. Non-limiting examples of drying agents include glucose syrup, corn syrup, sucrose, dextrins, maltodextrins, and combinations thereof.

The activated pectin-containing biomass composition after drying may be further comminuted, such that the activated pectin-containing biomass composition is in a dry particulate form, e.g. powder. Non-limiting examples of suitable comminuting methods include grinding, milling, and the like. The comminuting can further reduce the particle size of the dried activated pectin-containing biomass composition to provide a product having improved flowability, dispersability, hydration and/or handling properties. The particles can be comminuted to a size of 300 µm or less. The particles can be comminuted to a size of 250 µm or less. The particles can be comminuted to a size of 200 µm or less. The particles can be comminuted to a size of 150 µm or less. The particles can be comminuted to a size of 125 µm or less. The particles can be comminuted to a size of 100 µm or less. The particles can be comminuted to a size of 75 µm or less. For example, the particles can be comminuted to a desired size by milling. Any type of mill can be used. For example, any one or a combination of a hammer mill, a pin mill, a pinned disc mill, a beater mill, a cross beater mill, an air micronizer, a jet mill, a classifier mill, a ball mill, a rotary impact mill, and a turbo mill can be a used.

The activated pectin-containing biomass composition may be a food ingredient. That is, it is not a food additive. This has the advantage of being accepted by the food industry and critical consumers. The activated pectin-containing biomass composition derived from any exemplary method described herein is comprised in a product. The activated pectin-containing biomass composition as described herein is comprised in a product. Such a product may be a food product, but is not limited to food products.

Several aspects and embodiments of pectin-containing biomass compositions and methods for manufacture thereof are described herein. Features of the subject matter are described such that, within particular aspects, a combination of different features can be envisioned. For each and every aspect and each and every feature disclosed herein, all combinations that do not detrimentally affect the designs, compositions, processes, or methods described herein are contemplated and can be interchanged, with or without explicit description of the particular combination. Accordingly, unless explicitly recited otherwise, any aspect, embodiment or feature disclosed herein can be combined to describe inventive designs, compositions, processes, or methods consistent with the present disclosure.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein.

Values or ranges may be expressed herein as "about", from "about" one particular value, and/or to "about" another particular value. When such values or ranges are expressed, other aspects disclosed include the specific value recited, from the one particular value, and/or to the other particular value. Similarly, when values are expressed as approximations, by use of the antecedent "about," it will be understood that the particular value forms another aspect. It will be further understood that there are a number of values disclosed therein, and that each value is also herein disclosed as "about" that particular value in addition to the value itself. In aspects, "about" can be used to mean, for example, within 10% of the recited value, within 5% of the recited value, or within 2% of the recited value.

Concentrations and percent are in weight percent unless the context indicates otherwise.

While compositions and methods are described herein in terms of "comprising" various components or steps, the compositions and methods can also "consist essentially of" or "consist of" the various components or steps, unless stated otherwise.

The terms "a," "an," and "the" are intended to include plural alternatives, e.g., at least one, unless otherwise specified.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications and patents, which might be used in connection with the presently described invention.

EXAMPLES

The activated pectin-containing biomass compositions and methods may be further understood with the following non-limiting examples. These are merely examples for different starting materials and mechanical energy added for the described method for producing an activated pectin-containing biomass composition and the product comprising such an activated pectin-containing biomass composition The following protocols were used to analyze the degree of esterification (DE), degree of galacturonic acid (GA), an apparent viscosity (mPa·s), intrinsic viscosity (dL/g), residual sugar content (%), water binding (g/g), SAG, and percent recovery (%).

Protocol 1: Determination of Degree of Esterification and Degree of Galacturonic Acid The degree of esterification (DE) and degree of galacturonic acid (GA) were measured using a modification of the method set forth in FAO JECFA Monographs 4 (2007). 100 mL of the acid alcohol (100 mL 50-60% isopropanol+5 mL HCl fuming 37%) was added to 2.00 g of ground peel while stirring with a magnetic stirrer for 10 min. The mixture was filtered or passed through a Buchner funnel with filter paper and the beaker was rinsed with 6×15 mL acid alcohol and also filtered or passed through the Buchner funnel with filter paper. The filtrate was then washed first with approximately 1000 mL 50-60% isopropanol and thereafter with approximately 2×50 mL 100% isopropanol. The sample then was dried for approximately 2.5 hours at 105° C.

Samples weighing approximately 0.40 g were measured for duplicate determination (deviation between duplicate determinations must not exceed 1.5% absolute, otherwise the test was repeated). The samples were first moistened with approximately 2 mL 100% isopropanol. Approximately 50 mL carbon dioxide-free water then was added to the moistened samples while stirring with a magnetic stirrer. The samples were then evaluated by titration, either by means of an indicator or by using a pH meter/autoburette.

Titration Using Indicator. 5 drops of phenolphtalein indicator was added to the sample and it was titrated with 0.1 N NaOH until a change of color was observed (record it as $V_1$ titer). 20.0 mL 0.5 N NaOH was added while stirring and covered with foil for exactly 15 min. 20.0 mL 0.5 N HCl was added while stirring until the color disappeared. 3 drops of phenolphtalein indicator then was added and it was titrated with 0.1 N NaOH until a change of color was observed (record it as $V_2$ titer). In order to compensate for possible inaccuracies of balancing the two portions of 20 mL of 0.5 N NaOH and HCl respectively, a so-called "blind measurement" was performed (i.e., 100 mL of deionized water was treated in the same way as the sample solution, including the titrations). The last titration result was then recorded as $B_1$ titer. The degree of esterification and degree of galacturonic acid were then characterized by the following calculations.

$$V_t = V_1 + (V_2 - B_1) \quad (i)$$

$$\% \, DE(\text{Degree of esterification}) = [(V_2 - B_1)/V_t] * 100 \quad (ii)$$

$$\% \, GA(\text{Degree of galacturonic acid}) = \frac{[194.1 * V_t * N * 100]}{\text{weight of washed and dried sample (mg)}} \quad (iii)$$

wherein N=corrected normality for 0.1 N NaOH used for titration.

Protocol 2: Determination of Viscosity (VIS)

A 2% solution of pectin is made up at 25° C. in a medium containing sodium hexametaphosphate. Viscosity is determined with a Brookfield Viscometer type LVT or LVF after adjustment of pH to 4.0.

The apparatus included the following:
1. Analytical balance
2. Beakers; 400 mL and 2000 mL
3. Magnetic stirrer and Teflon-coated stir bars
4. pH-meter with suitable combination electrode
5. Cylinder glass, diameter 50±1 mm
6. Brookfield Viscometer type LVT or LVF
7. Thermometer, 0-110° C.
8. Volumetric flasks; 250 mL and 1000 mL
9. Serological (or measuring pipette); 10 mL The chemicals used were sodium hexametaphosphate (food grade), sodium hydrogen carbonate (NaHCO3) p.a., and 100% isopropanol (C3H8O).

One reagent was sodium hexametaphosphate solution prepared as follows: (i) disperse 11.11 g in 950 mL deionized water in a 2000 mL beaker and stir for 15 minutes; (ii) transfer the solution quantitatively to a 1000 mL volumetric flask, filling to 1000 mL with deionized water; (iii) stir for 15 minutes. A new solution should be prepared if sodium hexametaphosphate is not completely dissolved. The second reagent was sodium bicarbonate solution prepared as follows: (i) dissolve 84.01 g in deionized water, and (ii) fill up to 1000 mL with deionized water.

The procedure was as follows:
1. Weigh 4.00 g of sample and transfer to a tared 400 mL tared beaker containing a magnetic stir bar.
2. Using a serological pipette, add 10.0 mL isopropanol to wet the pectin. Place the beaker on the magnetic stirrer.
3. Add 180 mL sodium hexametaphosphate solution to the pectin dispersion while stirring. Continue stirring for 1 hour at approximately 700 rpm.
4. Place the pH-electrode in the pectin solution. Adjust pH to 3.95-4.05 by drop wise addition of sodium bicarbonate solution.
5. Adjust the net weight of the pectin solution to 200.0 g by adding deionized water.
6. Transfer the pectin solution to the cylinder glass. Adjust the temperature to 25° C. by placement of the cylinder glass with solution in a suitable cooling or heating bath.
7. Measure apparent viscosity on a Brookfield Viscometer type LVT or LVF using spindle No. 3, at 60 rpm. After 60 seconds of rotation, the reading is taken and with an accuracy of 0.5 on the scale.

Protocol 3: Determination of Intrinsic Viscosity and Recovery

Approximately 40 mg of sample was weighed and dispersed in 100 µL ethanol. 40 mL of effluent was added and the mixture was stirred using a magnetic stirrer in a 75±2° C. block heater for 30 minutes.

Effluent preparation for 10 liter effluent for FIPA (Safety: 0.3 M Lithiumacetatebuffer) was as follows:
1. Pour approx. 3 L Milli-Q water into a 5000-mL graduated beaker.
2. Add a magnetic stir bar and place on a magnetic stirrer to produce a suitable vortex during all additions.
3. Weigh 125.6 g lithium hydroxide monohydrate into a weighing boat and transfer quantitatively to the graduated beaker.
4. Weigh 0.20 g sodium azide into a weighing boat and transfer quantitatively to the graduated beaker.
5. Weigh 360.4 g glacial acetic acid into a 500-mL beaker and transfer quantitatively to the graduated beaker.
6. When all three chemicals are dissolved, add Milli-Q water to 5000 mL and maintain stirring for 5 min.
7. Pour the content into the pressure container.
8. Rinse the graduated beaker with a total volume of 5000 mL Milli-Q water that is transferred to the pressure container, thus producing a total of 10 L effluent.
9. The liquid is filtered using a Pressure filtration unit with Sartopore 2 filter from Sartorius (0.45+0.2 µm).
10. After preparation, check pH of the buffer, which must be 4.6±0.1.

The sample was transferred to a 5° C. water bath for 5 minutes to cool to room temperature and since the sample contains non-soluble material, it must be manually dissolved and filtrated (0.45 µm filter) prior to being transferred to an auto sampler vial. The intrinsic viscosity of the samples was then determined using size exclusion chromatography (SEC). The molecules were separated according to their size by gel permeation chromatography with the effluent from the chromatography column passing four detectors (Refractive Index Detector, Right Angle Laser Light Scattering Detector, Low Angle Laser Light Scattering Detector, and a Viscosity Detector). Viscotek software converted the detector signals from the viscosity detector and refractive index detector to intrinsic viscosity.

A Viscotek TDA 302 FIPA instrument mounted with Viscotek pump VE 1122 Solvent delivery system was used along with Thermo Separation Products Auto sampler AS 3000 with a sample preparation module. Columns included Thermo BioBasis SEC60 (150×7.8 mm) that were connected to a computer with OmniSEC software for data collection and calculations. The run time at the auto sampler was set at 10 minutes and a 25 µL full loop injection was used. The Viscotek TDS 302 FIPA instrument automatically measures the concentration of soluble pectin in the sample, thus, providing the percent recovery of pectin.

Protocol 4: Determination of Residual Sugar Content 10 g of a sample was measured in a 600 mL glass beaker. 200 mL 50% isopropanol was added to the sample and stirred for four hours on a magnet stirrer at room temperature. The mixture was transferred to a vacuum-drive Buchner funnel with filter paper and the beaker was rinsed with 250 mL 50% isopropanol to ensure transfer and wash of sample through the Buchner funnel with filter paper. The sample then was dried overnight (minimum of 12 hours) at 65-70° C. in a drying cabinet. The weight of the dried sample was then determined and the residual sugar was calculated:

$$\text{Residual Sugar} = \frac{[(\text{weight of dry sample} - \text{weight of dry, washed sample}) * 100]}{\text{weight of dry sample}}$$

Protocol 5: Determination of Water Binding Capacity

Water binding capacity was measured by a modified version of the AAC 56-30.01 method described in Kael Eggie's *Development of an extruded flax-based feed ingredient* (2010). 1.0 g of material was added to a 50 mL centrifuge tube and weighed. Deionized water was added to the centrifuge tube in small, unmeasured increments and stirred after each addition until the mixture was thoroughly wetted. The tube and its contents were vortexed and then centrifuged at 3000 rpm for 10 minutes at room temperature. The supernatant was discarded and, in cases where supernatant did not appear, more water was added and centrifugation was repeated. The final mass of the tube and container was recorded and the water binding capacity (WBC) was calculated by the following formula:

$$\text{Water Binding Capacity} = \frac{(\text{tube mass} + \text{sediment mass}) - (\text{tube mass} + \text{sample mass})}{\text{sample mass}}$$

Protocol 6: Determination of SAG

This method is identical to method 5-54 of the IFT committee on pectin standardization, apart from the fact that it is modified to use of a mechanic stirrer instead of a potato masher.

The apparatus included the following:
1. Analytical balance
2. Laboratory scale (max. load 3-5 kg, accuracy 0.2 g)
3. Stainless steel saucepan, 1.5 l, 15 cm diameter
4. Electric hotplate, 15 cm diameter, 1500 W
5. Stirrer motor, adjustable speed, 500-1000 rpm
6. Stirrer shaft (HETO, article No. 000240, drawing No. 0004259)
7. Beakers (1000 ml and 150 ml)
8. Spatula
9. Stop watch
10. Thermometer, 100° C.
11. pH-meter
12. SAG-glasses and tape
13. Ridgelimeter
14. Wire cheese slicer
15. Refractometer
16. Incubator The chemicals used were sugar, tartaric acid (488 g per liter solution), and deionized water.

The preparation of jelly was as follows:
1. Weigh into 1000 ml beaker 650−(650/x) g sugar, where x=assumed firmness of sample.
2. Transfer 20-30 g of the weighed sugar into a dry 150 ml beaker and add the weighed sample (the weight of the sample to use in a jelly is expressed as: 650 g/assumed grade).
3. Mix the sample and sugar thoroughly in the beaker by stirring with spatula.
4. Pour 410 ml deionized/distilled water into the 1500 ml tared, stainless steel saucepan and place stirrer shaft in it. Pour the sample/sugar mixture into water—all at once— while stirring at 1000 rpm. It is important as quickly as possible to submerge the sample/sugar solution in the water and transfer any traces of the sample/sugar in the small beaker to the saucepan.
5. Continue stirring for two minutes.
6. After 2 minutes, place saucepan on preheated electric hotplate, and stir at 500 rpm.
7. When contents reach a full rolling boil, add remaining sugar and continue heating and stirring until sugar is dissolved and until net weight of the jelly batch is 1015 g. The electric hotplate should be set so that the entire heating time for the jelly is 5-8 minutes (full load, 1500 W).
8. After weighing the 1015 g batch on the laboratory scale, leave it undisturbed on the table for one minute. Then tip the saucepan, so that the contents are just about to overflow, and quickly skim off any foam. Place thermometer in the batch and continue stirring gently until the temperature reaches exactly 95° C.
9. Quickly pour the batch into two previously prepared SAG glasses each containing 1.75-2.25 ml of tartaric acid solution and equipped with adhesive tape allowing filling to approx. 1 cm above the brims.
10. After 15 minutes, cover the glasses with lids, and when the temperature reaches 30-35° C., place the glasses in an incubator at 25±3° C. for 20-24 hours.

The properties of the jelly was measured as follows:
1. After 20-24 hours' storage of the jellies, remove lids from glasses and remove tape. Using a wire cheese slicer, the top layer was cut off and discarded.
2. Then carefully turn the jelly out of the glass to an inverted position on a square glass plate furnished with Ridgelimeter.

3. Start stop watch once the jelly is on the glass plate. If the jelly leaned slightly to one side this was corrected by gently tilting the glass plate in the other direction.
4. Place plate and jelly carefully on the base of the Ridgelimeter so that the jelly is centered under the micrometer screw, which should then be screwed down near to the surface of the jelly.
5. Two minutes after the stop watch was started, bring the point of the micrometer screw into contact with the jelly surface and record the Ridgelimeter reading to the nearest 0.1.
6. Measure pH, which must be between 2.2 and 2.4. Otherwise, the sample must be retested.

The jelly grade of the sample is calculated as follows:
1. Using the Ridgelimeter calibration table, convert the Ridgelimeter reading to a Factor 1 (see FIG. 1).
2. Using the soluble solids correcting table, the soluble solids measured is converted into a Factor 2 (see FIG. 2).
3. When multiplying the assumed grade of the test by the correction factors, the true grade is obtained using the following formula:

Assumed grade×Factor 1×Factor 2=true grade

TABLE 3

| Ridgelimeter reading percent SAG | Factor 1 |
|---|---|
| 19.0 | 1.200 |
| 19.1 | 1.195 |
| 19.2 | 1.190 |
| 19.3 | 1.186 |
| 19.4 | 1.182 |
| 19.5 | 1.177 |
| 19.6 | 1.173 |
| 19.7 | 1.168 |
| 19.8 | 1.163 |
| 19.9 | 1.158 |
| 20.0 | 1.155 |
| 20.1 | 1.150 |
| 20.2 | 1.146 |
| 20.3 | 1.142 |
| 20.4 | 1.137 |
| 20.5 | 1.133 |
| 20.6 | 1.128 |
| 20.7 | 1.124 |
| 20.8 | 1.120 |
| 20.9 | 1.115 |
| 21.0 | 1.110 |
| 21.1 | 1.107 |
| 21.2 | 1.102 |
| 21.3 | 1.097 |
| 21.4 | 1.093 |
| 21.5 | 1.088 |
| 21.6 | 1.084 |
| 21.7 | 1.080 |
| 21.8 | 1.076 |
| 21.9 | 1.072 |
| 22.0 | 1.067 |
| 22.1 | 1.062 |
| 22.2 | 1.057 |
| 22.3 | 1.054 |
| 22.4 | 1.048 |
| 22.5 | 1.044 |
| 22.6 | 1.040 |
| 22.7 | 1.035 |
| 22.8 | 1.031 |
| 22.9 | 1.027 |
| 23.0 | 1.022 |
| 23.1 | 1.018 |
| 23.2 | 1.013 |
| 23.3 | 1.009 |
| 23.4 | 1.005 |
| 23.5 | 1.000 |
| 23.6 | 0.997 |
| 23.7 | 0.992 |
| 23.8 | 0.987 |
| 23.9 | 0.983 |
| 24.0 | 0.978 |
| 24.1 | 0.974 |
| 24.2 | 0.969 |
| 24.3 | 0.965 |
| 24.4 | 0.960 |
| 24.5 | 0.957 |
| 24.6 | 0.953 |
| 24.7 | 0.948 |
| 24.8 | 0.944 |
| 24.9 | 0.940 |
| 25.0 | 0.936 |
| 25.1 | 0.933 |
| 25.2 | 0.928 |
| 25.3 | 0.925 |
| 25.4 | 0.921 |
| 25.5 | 0.917 |
| 25.6 | 0.913 |
| 25.7 | 0.910 |
| 25.8 | 0.906 |
| 25.9 | 0.902 |
| 26.0 | 0.898 |
| 26.1 | 0.895 |
| 26.2 | 0.892 |
| 26.3 | 0.888 |
| 26.4 | 0.885 |
| 26.5 | 0.881 |
| 26.6 | 0.878 |
| 26.7 | 0.875 |
| 26.8 | 0.872 |
| 26.9 | 0.868 |
| 27.0 | 0.864 |
| 27.1 | 0.862 |
| 27.2 | 0.859 |
| 27.3 | 0.856 |
| 27.4 | 0.853 |
| 27.5 | 0.850 |
| 27.6 | 0.847 |
| 27.7 | 0.844 |
| 27.8 | 0.842 |
| 27.9 | 0.838 |

TABLE 4

Correlation Values Calculated for "Exchanged" SAG Analysis

| Percent SS | Correction Factor 2 |
|---|---|
| 64.0 | 1.034 |
| 64.1 | 1.031 |
| 64.2 | 1.028 |
| 64.3 | 1.024 |
| 64.4 | 1.021 |
| 64.5 | 1.018 |
| 64.6 | 1.015 |
| 64.7 | 1.012 |
| 64.8 | 1.008 |
| 64.9 | 1.004 |
| 65.0 | 1.000 |
| 65.1 | 0.997 |
| 65.2 | 0.993 |
| 65.3 | 0.990 |
| 65.4 | 0.987 |
| 65.5 | 0.984 |
| 65.6 | 0.980 |
| 65.7 | 0.975 |
| 65.8 | 0.970 |
| 65.9 | 0.967 |
| 66.0 | 0.964 |

TABLE 4-continued

Correlation Values Calculated for "Exchanged" SAG Analysis

| Percent SS | Correction Factor 2 |
|---|---|
| 66.1 | 0.960 |
| 66.2 | 0.957 |

Example 1

Fresh orange peel was washed in alcohol using the methods described in U.S. Pat. No. 8,323,513 and then pressed by hand, followed by a second consecutive wash/press to form alcohol washed starting pectin-containing biomass material. The dry alcohol washed starting pectin-containing biomass material was then divided into four samples—Samples 1, 2, 3, and 4.

Sample 1 (activated/no mechanical energy): 2,500 grams (dry matter) of alcohol washed starting pectin-containing biomass material was activated by contacting the material with alcohol and acid at 60° C. for 1 hour without being subjected to mechanical energy. The amount of acid that was used was selected to correspond to the amount of acid used in a dry peel extraction (0.1 mL acid/gram peel): 2500 gram dry peel, 250 mL 62% nitric acid; 20 L 60% isopropyl alcohol. After conventionally activating—i.e., without mechanical energy—the sample was cooled to 25° C. and was drained. The drained sample was then washed with 100 L 60% isopropyl alcohol, and then dried in a heat cabinet at 65° C. for 10 hours. The dried sample was then milled to a particle size of 250 microns.

Sample 2 (activated/mechanical energy): 1,000 grams (dry matter) of alcohol washed starting pectin-containing biomass material was activated by contacting the material with alcohol and acid at 70° C. for 1 hour under mechanical energy of 10,800 kilojoules. The amount of acid that was used was selected to correspond to the amount of acid used in a dry peel extraction (0.1 mL acid/gram peel): 1000 gram dry peel, 100 mL 62% nitric acid; 30 L 60% isopropyl alcohol.

The mechanical energy was induced by constant recirculation pumping of the sample mixture (material, alcohol, and acid)—more particularly, the sample mixture was continuously recirculated at 5,200 L/hr from a vessel (KOFA ApS, volume 25 L) through a tube heat exchanger (3 meters in length; 6" outer diameter; 2 inner tubes, each with a diameter of 1½") and back to the vessel by a lobe pump (APV, CL/1/021/10) that operated at 50 Hz.

After being activated under mechanical energy, the sample mixture was cooled to 15° C. and then was drained using a Vincent press (model CP-4). The drained sample was then conventionally washed twice, where each wash was for 5 minutes in 30 L 60% isopropyl alcohol with a pH adjustment to 3.5 using 10% sodium carbonate. The washed sample was then dried in a heat cabinet at 65° C. for 10 hours. The dried sample was then milled to a particle size of 250 microns.

Sample 3 (non-activated/no mechanical energy): 30 grams (dry matter) of alcohol washed starting pectin-containing biomass material was milled to a particle size of 250 microns.

Sample 4 (non-activated/mechanical energy): 30 grams (dry matter) of alcohol washed starting pectin-containing biomass material was suspended in 3 L of de-ionized water and then passed through a homogenizer (APV Rannie 1000 homogenizer, type 12.50, reg.no. 113, Copenhagen Denmark) twice at 300 bar to impart comparable mechanical energy to that of Sample 2. The homogenized sample was mixed with 6 L 100% isopropanol and then drained in a 60μ nylon cloth. The drained sample was then dried in a heat cabinet at 65° C. for 10 hours, after which the dried sample was milled to a particle size of 250 microns.

A dry, traditional water washed orange peel was obtained and divided into four samples—Sample 5, 6, 7, and 8.

Sample 5 (activated/no mechanical energy): 500 grams (dry matter) of water washed starting pectin-containing biomass material was activated by contacting the material with 15 L of 60% ethanol and 50 mL of 62% nitric acid at 65° C. for 2 hours without being subjected to mechanical energy. After conventionally activating—i.e., without mechanical energy—the sample was cooled to 25° C. and then was drained. The drained sample was then washed with 15 L 60% ethanol with a pH adjustment to 4.0 with 10% sodium carbonate, and then dried in a heat cabinet at 65° C. for 10 hours. The dried sample was then milled to a particle size of 250 microns.

Sample 6 (activated/mechanical energy): 1,000 grams (dry matter) of water washed starting pectin-containing biomass material was activated by contacting the material with 30 L of 60% ethanol and 100 mL of 62% nitric acid at 70° C. for 1 hour under mechanical energy of 10,800 kilojoules.

The mechanical energy was induced by constant recirculation pumping of the sample mixture (material, alcohol, and acid)—more particularly, the sample mixture was continuously recirculated at 5,200 L/hr from a vessel (KOFA ApS, volume 25 L) through a tube heat exchanger (3 meters in length; 6" outer diameter; 2 inner tubes, each with a diameter of 1½") and back to the vessel by a lobe pump (APV, CL/1/021/10) that operated at 50 Hz.

After being activated under mechanical energy, the sample mixture was cooled to 15° C. and then was drained using a Vincent press (model CP-4). The drained sample was then conventionally washed for 5 minutes in 30 L 60% ethanol with a pH adjustment to 4.0 using 10% sodium carbonate. The washed sample was then dried in a heat cabinet at 65° C. for 10 hours. The dried sample was then milled to a particle size of 250 microns.

Sample 7 (non-activated/no mechanical energy): 30 grams (dry matter) of water washed starting pectin-containing biomass material was milled to a particle size of 250 microns.

Sample 8 (non-activated/mechanical energy): 30 grams (dry matter) of water washed starting pectin-containing biomass material was suspended in 3 L of de-ionized water and then passed through a homogenizer (APV Rannie 1000 homogenizer, type 12.50, reg.no. 113, Copenhagen Denmark) twice at 300 bar to impart comparable mechanical energy to the sample, as in Sample 2. The homogenized sample was mixed with 6 L 100% isopropanol and then drained in a 60μ nylon cloth. The drained sample was then dried in a heat cabinet at 65° C. for 10 hours, after which the dried sample was milled to a particle size of 250 microns.

The recovery (% of soluble pectin within the sample), the intrinsic viscosity (of the pectin extracted from the sample), residual sugar content (% by weight of the sample), degree of esterification of the pectin in the sample (DE), degree of galacturonic acid of the sample (GA), apparent viscosity (VIS) of the sample in a 2% solution/dispersion at pH 4, and water binding capacity of the sample (grams of water/grams of dry matter) were measured and the coil overlap parameter was calculated. The results are summarized in the below table.

TABLE 5

| Sample | Activated | ME | Recovery (%) | IV (dL/g) | Coil Overlap (dL/g) | Residual Sugar (%) | DE (%) | GA (%) | VIS (mPa·s) | Water Binding (g/g) |
|---|---|---|---|---|---|---|---|---|---|---|
| 1 | Yes | No | 34 | 10 | 3.40 | 2.3 | 72.8 | 49.8 | 1020 | n/a |
| 2 | Yes | Yes | 38.4 | 9.1 | 3.49 | 2.6 | 73.4 | 48.8 | 1810 | 15 |
| 3 | No | No | 18.4 | 9.8 | 1.80 | 12.2 | 74.6 | 44 | 240 | 13.9 |
| 4 | No | Yes | 22.8 | 7.6 | 1.73 | 12.2 | 74.6 | 44 | 270 | 22.6 |
| 5 | Yes | No | 19.5 | 10 | 1.95 | 0.97 | 67.6 | 45 | 90 | NA |
| 6 | Yes | Yes | 39.4 | 7.7 | 3.03 | 0.7 | 67.4 | 49.4 | 1188 | 18.3 |
| 7 | No | No | 19.9 | 7 | 1.39 | 13.5 | 67.5 | 42.6 | 54 | 9.6 |
| 8 | No | Yes | 23.2 | 6 | 1.39 | 13.5 | 67.5 | 42.6 | 92 | 12.6 |

As illustrated in the Table 5, the alcohol washed sample that was activated under mechanical energy has a higher apparent viscosity than the comparable sample activated without being under mechanical energy. In fact, all the samples that went under mechanical energy had a greater apparent viscosity than the apparent viscosity of their comparable that did undergo mechanical energy.

Further illustrated, the samples that were subjected to mechanical energy also have a greater pectin recovery. This result is surprising as it was conventionally believed that exposing the starting pectin-containing biomass material to mechanical energy of greater than 1,200 kilojoules per kg dry matter would break or disintegrate the material into a form that made separation of the activating solution, and also extraction of the pectin there from more difficult, and therefore undesirably decrease pectin yield.

The coil overlap parameter of Sample 2 indicates that a pectin-containing composition that is alcohol washed and subsequently activated under mechanical energy has the greatest desirable functionality.

Example 2

Fresh orange peel was washed in alcohol using the methods described in U.S. Pat. No. 8,323,513 and then pressed by hand, followed by a second consecutive wash/press to form alcohol washed starting pectin-containing biomass material. The dry alcohol washed starting pectin-containing biomass material was then divided into two samples, Samples 1 and 2.

Sample 1 (alcohol washed/activated): 1,000 grams (dry matter) of alcohol washed starting pectin-containing biomass material was activated by contacting the material with alcohol and acid at 70° C. for 1 hour under mechanical energy of 10,800 kilojoules. The amount of acid that was used was selected to correspond to the amount of acid used in a dry peel extraction (0.1 mL acid/gram peel): 1000 gram dry peel, 100 mL 62% nitric acid; 30 L 60% isopropyl alcohol.

The mechanical energy was induced by constant recirculation pumping of the sample mixture (material, alcohol, and acid)—more particularly, the sample mixture was continuously recirculated at 5,200 L/hr from a vessel (KOFA ApS, volume 25 L) through a tube heat exchanger (3 meters in length; 6" outer diameter; 2 inner tubes, each with a diameter of 1½") and back to the vessel by a lobe pump (APV, CL/1/021/10) that operated at 50 Hz.

After being activated under mechanical energy, the sample mixture was cooled to 15° C. and then was drained using a Vincent press (model CP-4). The drained sample was then conventionally washed twice, where each wash was for 5 minutes in 30 L 60% isopropyl alcohol with a pH adjustment to 3.5 using 10% sodium carbonate. The washed sample was then dried in a heat cabinet at 65° C. for 10 hours. The dried sample was then milled to a particle size of 250 microns.

Sample 2 (alcohol washed/activated): Sample 2 was prepared similarly as Sample 1, except that Sample 2 was activated at a temperature of 40° C.

Dry, conventional water-washed orange peel was obtained and divided into two samples—Samples 3 and 4.

Sample 3 (water washed/activated): 1,000 grams (dry matter) of water washed starting pectin-containing biomass material was activated by contacting the material with 30 L of 60% ethanol and 100 mL of 62% nitric acid at 70° C. for 1 hour under mechanical energy of 10,800 kilojoules.

The mechanical energy was induced by constant recirculation pumping of the sample mixture (material, alcohol, and acid)—more particularly, the sample mixture was continuously recirculated at 5,200 L/hr from a vessel (KOFA ApS, volume 25 L) through a tube heat exchanger (3 meters in length; 6" outer diameter; 2 inner tubes, each with a diameter of 1½") and back to the vessel by a lobe pump (APV, CL/1/021/10) that operated at 50 Hz.

After being activated under mechanical energy, the sample mixture was cooled to 15° C. and then was drained using a Vincent press (model CP-4). The drained sample was then conventionally washed for 5 minutes in 30 L 60% ethanol with a pH adjustment to 4.0 using 10% sodium carbonate. The washed sample was then dried in a heat cabinet at 65° C. for 10 hours. The dried sample was then milled to a particle size of 250 microns.

Sample 4 (water washed/activated): Sample 4 was prepared similarly as Sample 3, except that Sample 4 was activated at a temperature of 40° C.

The recovery (% of soluble pectin within the sample), the intrinsic viscosity (of the pectin extracted from the sample), residual sugar content (% by weight of the sample), degree of esterification of the pectin in the sample (DE), degree of galacturonic acid of the sample (GA), apparent viscosity (of the solution having the sample dissolved or dispersed there through), and water binding capacity of the sample (grams of water/grams of solid matter) were measured and the coil overlap parameter was calculated. The results are summarized in the below table.

TABLE 6

| Sample | Recovery (%) | IV (dL/g) | Coil Overlap (dL/g) | Residual Sugar (%) | DE (%) | GA (%) | VIS (mPa · s) | Water Binding (g/g) |
|---|---|---|---|---|---|---|---|---|
| 1 | 38.4 | 9.1 | 3.49 | 2.6 | 73.4 | 48.8 | 1810 | 15 |
| 2 | 25 | 8.3 | 2.08 | 1.29 | 71.7 | 44 | 156 | 16.7 |
| 3 | 39.4 | 7.7 | 3.03 | 0.7 | 67.4 | 49.4 | 1188 | 18.3 |
| 4 | 28.3 | 8.3 | 2.35 | 0.97 | 68.4 | 45.9 | 266 | 16.2 |

The samples show that the functional property apparent viscosity is much higher in the samples that have undergone the mechanical treatment at 70° C. than those that were treated at 40° C. This indicates that processing the starting pectin-containing biomass material at temperatures higher than 40° C. results in material have greater functionality compared to materials processed at temperatures lower than 40° C.

Example 3

Fresh orange peel was washed in alcohol using the methods described in U.S. Pat. No. 8,323,513 and then pressed by hand, followed by a second consecutive wash/press, and then dried to form dry, alcohol washed starting pectin-containing biomass material. The dry, alcohol washed starting pectin-containing biomass material was then divided into two samples—Samples 1 and 2.

Sample 1 (dry/no mechanical energy): 2,500 grams (dry matter) of alcohol washed starting pectin-containing biomass material was activated by contacting the material with alcohol and acid at 70° C. for 1 hour without being subjected to mechanical energy. The amount of acid that was used was selected to correspond to the amount of acid used in a dry peel extraction (0.1 mL acid/gram peel): 2500 gram dry peel, 250 mL 62% nitric acid; 20 L 60% isopropyl alcohol. After conventionally activating—i.e., without mechanical energy—the sample was cooled to 25° C. and was drained. The drained sample was then washed with 100 L 60% isopropyl alcohol, and then dried in a heat cabinet at 65° C. for 10 hours. The dried sample was then milled to a particle size of 250 microns.

Sample 2 (dry/mechanical energy): 1,000 grams (dry matter) of alcohol washed starting pectin-containing biomass material was activated by contacting the material with alcohol and acid at 70° C. for 1 hour under mechanical energy of 10,800 kilojoules. The amount of acid that was used was selected to correspond to the amount of acid used in a dry peel extraction (0.1 mL acid/gram peel): 1000 gram dry peel, 100 mL 62% nitric acid; 30 L 60% isopropyl alcohol.

The mechanical energy was induced by constant recirculation pumping of the sample mixture (material, alcohol, and acid)—more particularly, the sample mixture was continuously recirculated at 5,200 L/hr from a vessel (KOFA ApS, volume 25 L) through a tube heat exchanger (3 meters in length; 6" outer diameter; 2 inner tubes, each with a diameter of 1½") and back to the vessel by a lobe pump (APV, CL/1/021/10) that operated at 50 Hz.

After being activated under mechanical energy, the sample mixture was cooled to 15° C. and then was drained using a Vincent press (model CP-4). The drained sample was then conventionally washed twice, where each wash was for 5 minutes in 30 L 60% isopropyl alcohol with a pH adjustment to 3.5 using 10% sodium carbonate. The washed sample was then dried in a heat cabinet at 65° C. for 10 hours. The dried sample was then milled to a particle size of 250 microns.

Fresh orange peel was washed in alcohol using the methods described in U.S. Pat. No. 8,323,513 to form wet and pressed alcohol washed starting pectin-containing biomass material.

Sample 3 (wet/mechanical energy): 950 grams (dry matter) of wet and pressed alcohol washed starting pectin-containing biomass material was activated by contacting the material with alcohol and acid at 70° C. for 1 hour under mechanical energy of 10,800 kilojoules. The amount of acid that was used was selected to correspond to the amount of acid used in a dry peel extraction (0.1 mL acid/gram peel): 1000 gram dry peel, 100 mL 62% nitric acid; 30 L 60% isopropyl alcohol.

The mechanical energy was induced by constant recirculation pumping of the sample mixture (material, alcohol, and acid)—more particularly, the sample mixture was continuously recirculated at 5,200 L/hr from a 25 L stainless steel vessel (no agitation) through a tube heat exchanger (3 meters in length; 6" outer diameter of 6"; 2 inner tubes, each with a diameter of 1½") and back to the vessel by a lobe pump (APV, CL/1/021/10) that operated at 50 Hz.

After being activated under mechanical energy, the sample mixture was cooled to 15° C. and then was drained using a Vincent press (model CP-4). The drained sample was then conventionally washed twice, where each wash was for 5 minutes in 30 L 60% isopropyl alcohol with a pH adjustment to 3.5 using 10% sodium carbonate. The washed sample was then dried in a heat cabinet at 65° C. for 10 hours. The dried sample was then milled to a particle size of 250 microns.

The recovery (% of soluble pectin within the sample), the intrinsic viscosity (of the pectin extracted from the sample), residual sugar content (% by weight of the sample), degree of esterification of the pectin in the sample (DE), degree of galacturonic acid of the sample (GA), apparent viscosity (of the solution having the sample dissolved or dispersed there through), and water binding capacity of the sample (grams of water/grams of solid matter) were measured and the coil overlap parameter was calculated. The results are summarized in the below table.

TABLE 7

| Sample | Recovery (%) | IV (dL/g) | Coil Overlap (dL/g) | Residual Sugar (%) | DE (%) | GA (%) | VIS (mPa·s) | Water Binding (g/g) | SAG |
|---|---|---|---|---|---|---|---|---|---|
| 1 | 34 | 10 | 3.40 | 2.3 | 72.8 | 49.8 | 1020 | n/a | 111 |
| 2 | 38.4 | 9.1 | 3.49 | 2.6 | 73.4 | 48.8 | 1810 | 15 | 122 |
| 3 | 50.7 | 9.1 | 4.61 | 2.1 | 73.5 | 50 | 3100 | 24.6 | 142 |

As illustrated in Table 7, the functional property apparent viscosity is much higher in the sample in which the starting pectin-containing biomass material was washed, but not subsequently dried. This shows that it may be desirable, in certain instances, to avoid drying the washed starting pectin-containing biomass material prior to activation (contacting the starting pectin-containing biomass material with an activating solution and subjecting the mixture to mechanical energy). Also as illustrated in the table, the functional property SAG follows the same pattern as the functional property viscosity.

Example 4

Fresh orange peel was washed in alcohol using the methods described in U.S. Pat. No. 8,323,513 and then pressed by hand, followed by a second consecutive wash/press to form alcohol washed and dried starting pectin-containing biomass material.

Sample 1: 1,000 grams (dry matter) of alcohol washed starting pectin-containing biomass material was activated by contacting the material with alcohol and acid at 70° C. for 1 hour under mechanical energy of 10,800 kilojoules. The amount of acid that was used was selected to correspond to the amount of acid used in a dry peel extraction (0.1 mL acid/gram peel): 1000 gram dry peel, 100 mL 62% nitric acid; 30 L 60% isopropyl alcohol.

The mechanical energy was induced by constant recirculation pumping of the sample mixture (material, alcohol, and acid)—more particularly, the sample mixture was continuously recirculated at 5,200 L/hr from a vessel (KOFA ApS, volume 25 L) through a tube heat exchanger (3 meters in length; 6" outer diameter; 2 inner tubes, each with a diameter of 1½") and back to the vessel by a lobe pump (APV, CL/1/021/10) that operated at 50 Hz.

After being activated under mechanical energy, the sample mixture was cooled to 15° C. and then was drained using a Vincent press (model CP-4). The drained sample was then conventionally washed twice, where each wash was for 5 minutes in 30 L 60% isopropyl alcohol with a pH adjustment to 3.5 using 10% sodium carbonate. The washed sample was then dried in a heat cabinet at 65° C. for 10 hours. The dried sample was then milled and then sifted on a 100 micron screen in order for all samples being of same mesh size.

Sample 2: Fresh orange peel was washed in alcohol using the methods described in U.S. Pat. No. 8,323,513 and then pressed by hand, followed by a second consecutive wash/press to form wet, alcohol washed starting pectin-containing biomass material.

950 grams (dry matter) of wet, alcohol washed starting pectin-containing biomass material was activated by contacting the material with alcohol and acid at 70° C. for 1 hour under mechanical energy of 10,800 kilojoules. The amount of acid that was used was selected to correspond to the amount of acid used in a dry peel extraction (0.1 mL acid/gram peel): 1000 gram dry peel, 100 mL 62% nitric acid; 30 L 60% isopropyl alcohol.

The mechanical energy was induced by constant recirculation pumping of the sample mixture (material, alcohol, and acid)—more particularly, the sample mixture was continuously recirculated at 5,200 L/hr from a 25 L stainless steel vessel (no agitation) through a tube heat exchanger (3 meters in length; 6" outer diameter of 6"; 2 inner tubes, each with a diameter of 1½") and back to the vessel by a lobe pump (APV, CL/1/021/10) that operated at 50 Hz.

After being activated under mechanical energy, the sample mixture was cooled to 15° C. and then was drained using a Vincent press (model CP-4). The drained sample was then conventionally washed twice, where each wash was for 5 minutes in 30 L 60% isopropyl alcohol with a pH adjustment to 3.5 using 10% sodium carbonate. The washed sample was then dried in a heat cabinet at 65° C. for 10 hours. The dried sample was then milled and then sifted on a 100 micron screen in order for all samples being of same mesh size Four comparative samples were also obtained, all having been sieved on a 100 micron sieve. These comparative samples were commercial citrus fiber products as indicated in the below table:

TABLE 8

| Commerical Samples | Commerical Name | Commerical Batch No. |
|---|---|---|
| C1 | CitriFi 100M40 | R13162M40 |
| C2 | Herbacel AQ Plus citrus | 31210020 |
| C3 | FiberGel Citrus 5100 | 510015M21A |
| C4 | Ceamfibre 7000 | PT52825 |

The recovery (% of soluble pectin within the sample), the intrinsic viscosity (of the pectin extracted from the sample), residual sugar content (% by weight of the sample), degree of esterification of the pectin in the sample (DE), degree of galacturonic acid of the sample (GA), apparent viscosity (of the solution having the sample dissolved or dispersed there through), water binding capacity of the sample (grams of water/grams of solid matter), and SAG of the sample were measured and the coil overlap parameter was calculated. The results are summarized in the below table.

TABLE 9

| Sample | Recovery (%) | IV (dL/g) | Coil Overlap (dL/g) | Residual Sugar (%) | DE (%) | GA (%) | VIS (mPa·s) | Water Binding (g/g) | SAG |
|---|---|---|---|---|---|---|---|---|---|
| 1 | 37.2 | 7.2 | 2.68 | 3.7 | 73.3 | 49.9 | 558 | 18.2 | 101 |
| 2 | 43.8 | 7.5 | 3.29 | 2.8 | 73.1 | 51.1 | 1266 | 24.6 | 128 |
| C1 | 18.2 | 6.1 | 1.11 | 21.1 | 67.6 | 44.3 | 56 | 13.1 | <<60 |
| C2 | 10.3 | 3.4 | 0.35 | 1.9 | 60.9 | 22.5 | 180 | 16.5 | No gel |
| C3 | 20.9 | 2.7 | 0.56 | 39.6 | 6.6 | 43.8 | 10 | 8.1 | No gel |
| C4 | 0.6 | 2.2 | 0.01 | N/A | 19 | 3.5 | 4 | 7.1 | No gel |

As illustrated in the Table 9, none of the comparative samples have a coil overlap parameter that is greater, and therefore, as compared to Samples 1-2, has lower functionality. Furthermore, Samples 1-2 have greater apparent viscosity and water binding capacity, as well as, unlike the comparative samples, have the capability of gelling. These results show the functional superiority of exemplary pectin-containing biomass compositions of the present disclosure as compared to conventional pectin-containing biomass compositions.

Example 5

Fresh orange peel was washed in alcohol using the methods described in U.S. Pat. No. 8,323,513 and then pressed by hand, followed by a second consecutive wash/press, and then subsequently dried at 65° C. for 10 hours to form dried, alcohol washed starting pectin-containing biomass material (5-10% residual moisture).

Fresh orange peel was washed in alcohol using the methods described in U.S. Pat. No. 8,323,513 and then pressed by hand, followed by a second consecutive wash/press to form wet, alcohol washed starting pectin-containing biomass material (35-45% dry matter).

Pre-Treated Samples (Samples 1-4): For each sample, a mixture of 1,000 grams (dry matter) of dried alcohol washed starting pectin-containing biomass material and an activating solution (100 mL of 62% nitric acid: 30 L 60% alcohol) underwent pre-treatment by being passed once through a Boston Shear Mill (BSM) at room temperature (model BSM-25 with a motor size of 15 HP (11 kW) and an outlet diameter of 1" (25 mm)). The pre-treated mixture for each sample was then further processed. The amount of mechanical energy imparted to Samples 1, 2, 3, and 4, by the Boston Shear Mill was calculated from the effect of the BSM and the time to process the sample. For sample 1 and 2, the time to process the 33 liters through the BSM was 125 seconds; the energy added to the sample was 11 kW*125 seconds, or 1380 kilojoules. For samples 3 and 4 the flow was higher and the processing time only 63 seconds, hence the energy added was 690 kilojoules (per kg dry matter).

Sample 2 and Sample 4: For each sample, the pre-treated mixture was transferred to a closed plastic bag and placed at 65° C. for 3-4 hours with no mechanical input. The sample was subsequently drained, washed in 20 L 80% isopropyl alcohol at pH of 4. Then the sample was drained, pressed and dried. The dried sample was then milled to a particle size of 250 microns.

Sample 1 and Sample 3: For each sample, the pre-treated mixture (material, alcohol, and acid) was further processed in an inator system. The mechanical energy was induced by constant recirculation pumping of the sample mixture (material, alcohol, and acid)—more particularly, the sample mixture was continuously recirculated at about 1,000 L/hr from a 25 L stainless steel vessel (no agitation) through a tube heat exchanger (3 meters in length; 6" outer diameter of 6"; 2 inner tubes, each with a diameter of 1½") maintaining a temperature of 65° C. and back to the vessel by a lobe pump (APV, CL/1/021/10) that operated at 10 Hz for a period of 50 minutes (3000 seconds), including heating (15 minutes) and cooling (15 minutes).

The pump motor is 2 kW at 50 Hz; at 10 Hz the effect is only 0.4 kW; the energy imparted to the sample 1 and 3 was 0.4 kW*3000 seconds, or 1200 kilojoules (per kg dry matter).

After being activated under mechanical energy, the sample mixture was cooled to 15° C. and then was drained using a Vincent press (model CP-4). The drained sample was then conventionally washed twice, where each wash was for 5 minutes in 30 L 60% isopropyl alcohol with a pH adjustment to 4 using 10% sodium carbonate. The washed sample was then dried in a heat cabinet at 65° C. for 10 hours. The dried sample was then milled and then sifted on a 250 micron screen.

Non-Pretreated Samples: For each sample, a mixture of 1,000 grams (dry matter) of dried alcohol washed and an activating solution (100 mL of 62% nitric acid: 30 L 60% alcohol) was processed in an inator. The mechanical energy was induced by constant recirculation pumping of the sample mixture (material, alcohol, and acid)—more particularly, the sample mixture was continuously recirculated at about 1,000 L/hr from a 25 L stainless steel vessel (no agitation) through a tube heat exchanger (3 meters in length; 6" outer diameter of 6"; 2 inner tubes, each with a diameter of 1½") maintaining a temperature of 65° C. and back to the vessel by a lobe pump (APV, CL/1/021/10) that operated at different frequencies (Hz) and for different periods of time.

After being activated under mechanical energy, the sample mixture was cooled to 15° C. and then was drained using a Vincent press (model CP-4). The drained sample was then conventionally washed twice, where each wash was for 5 minutes in 30 L 60% isopropyl alcohol with a pH adjustment to 4 using 10% sodium carbonate. The washed sample was then dried in a heat cabinet at 65° C. for 10 hours. The dried sample was then milled and then sifted on a 250 micron screen.

The processing parameters for the non-pretreated samples are summarized in the below table:

TABLE 10

| Sample | Lobe pump speed and corresponding effect | Time including heating and cooling (minutes) |
|---|---|---|
| 5 | 10 Hz (0.4 kW) | 50 |
| 6 | 20 Hz (0.8 kW) | 50 |
| 7 | 40 Hz (1.6 kW) | 50 |

TABLE 10-continued

| Sample | Lobe pump speed and corresponding effect | Time including heating and cooling (minutes) |
|---|---|---|
| 9 | 40 Hz (1.6 kW) | 90 |
| 10 | 30 Hz (1.2 kW) | 90 |

Sample 8: 1,000 (dry matter) of alcohol washed starting pectin-containing biomass material was activated by contacting the material with alcohol and acid at 65° C. for 3-4 hours without being subjected to mechanical energy. The amount of acid that was used was selected to correspond to the amount of acid used in a dry peel extraction (0.1 mL acid/gram peel): 1,000 gram dry peel, 100 mL 62 nitric acid; 30 L 60% isopropyl alcohol.

After conventionally activating—i.e., without mechanical energy—the sample was cooled to 25° C. and then was drained. The drained sample was then conventionally washed for 30 minutes in 30 L 80% isopropanol with a pH adjustment to 4.0 using 10% sodium carbonate. The washed peel was then dried in a heat cabinet at 65° C. for 10 hours. The dried sample was then milled to a particle size of 250 microns.

The total amount of mechanical energy imparted to each sample is summarized in the below table:

TABLE 11

| Sample | BSM Energy (kJ) | Inator Energy* (kJ) | Total Energy** (kJ) |
|---|---|---|---|
| 1 | 1380 | 1200 | 2580 |
| 2 | 1380 | 0 | 1380 |
| 3 | 690 | 1200 | 1890 |
| 4 | 690 | 0 | 690 |
| 5 | 0 | 1200 | 1200 |
| 6 | 0 | 2400 | 2400 |
| 7 | 0 | 4800 | 4800 |
| 8 | 0 | 0 | 0 |
| 9 | 0 | 8640 | 8640 |
| 10 | 0 | 6480 | 6480 |

*Inator Energy was calculated by the effect of the pump and the operating time
**Total Energy is the summation of the BSM Energy and Inator Energy The recovery (% of soluble pectin within the sample), the intrinsic viscosity (of the pectin extracted from the sample), degree of esterification of the pectin in the sample (DE), apparent viscosity (of the solution having the sample dissolved or dispersed there through), and water binding capacity of the sample (grams of water/grams of solid matter), were measured and the coil overlap parameter was calculated. The results are summarized in the below table.

TABLE 12

| Sample | Recovery (%) | IV (dL/g) | Coil Overlap (dL/g) | DE (%) | VIS (mPa · s) | Water Binding (g/g) |
|---|---|---|---|---|---|---|
| 1 | 28.2 | 8.4 | 2.4 | 66.3 | 583 | 26.7 |
| 2 | 19.5 | 9.6 | 1.9 | 67.9 | 219 | 20.7 |
| 3 | 28.6 | 8.2 | 2.3 | 68.4 | 730 | 24.6 |
| 4 | 18.3 | 10 | 1.8 | 68.7 | 238 | 21.7 |
| 5 | 25.8 | 8.9 | 2.3 | 69.4 | 439 | 21.5 |
| 6 | 29.6 | 8.2 | 2.4 | 69.5 | 573 | 21.2 |
| 7 | 26 | 9 | 2.3 | 69.6 | 512 | 22.2 |
| 8 | 19.1 | 8.8 | 1.7 | 68.8 | 165 | 15.6 |
| 9 | 30.4 | 8 | 2.4 | 69.4 | 628 | 22.4 |
| 10 | 30.4 | 8 | 2.4 | 69.6 | 691 | 20 |

As illustrated in the table, when the amount of mechanical energy imparted to the sample exceeds 1,500 kilojoules per kg dry matter, the coil overlap parameter is greater than 2 and therefore has apparent viscosity above 500 mPas.

Example 6

Fresh orange peel was washed in alcohol using the methods described in U.S. Pat. No. 8,323,513 and then pressed by hand, followed by a second consecutive wash/press, to form alcohol washed starting pectin-containing biomass material.

Samples 1-3 (Heating in Inator): For each sample, a mixture of 1,000 grams (dry matter) of alcohol washed, pressed peel and an activating solution (100 mL of 62% nitric acid: 30 L 60% alcohol) was processed in an inator.

The mechanical energy was induced by constant recirculation pumping of the sample mixture (material, alcohol, and acid)—more particularly, the sample mixture was continuously recirculated from a 25 L stainless steel vessel (no agitation) through a tube heat exchanger (3 meters in length; 6" outer diameter of 6"; 2 inner tubes, each with a diameter of 1½") maintaining a temperature of 70° C. and back to the vessel by a lobe pump (APV, CL/1/021/10) that operated at 40 Hz (Sample 1) for a period of 50 minutes (3000 seconds), including heating and cooling; 40 Hz (Sample 2) for a period of 90 minutes (5400 seconds), including heating and cooling; 50 Hz (Sample 3) for a period of 50 minutes (3000 seconds), including heating and cooling.

The drained sample was then conventionally washed for 30 minutes in 30 L 80% isopropanol with a pH adjustment to 4.0 using 10% sodium carbonate. The washed peel was then dried in a heat cabinet at 65° C. for 10 hours. The dried sample was then milled to a particle size of 250 microns.

Samples 4-9 (Heating after Inator): For each sample, a mixture of 1,000 grams (dry matter) of alcohol washed, pressed peel and an activating solution (100 mL of 62% nitric acid: 30 L 60% alcohol) was processed in an inator as described under samples 1-3 but the process was run at 25° C. and the pump was operating at 50 Hz. The samples 4-6 were all treated for a period of 20 minutes (1200 seconds) and the samples 7-9 were treated for a period of 60 minutes (3600 seconds)After the Inator treatment, the mixture was separated into peel and the activating solution. The activating solution was heated to 70° C. in a stirred vessel and the peel was added into the vessel. The heating time at 70° C. was 5 minutes (sample 4), 20 minutes (sample 5) and 60 minutes (sample 6), 5 minutes (sample 7), 20 minutes (sample 8), and 60 minutes (sample 9).

The drained sample was then conventionally washed for 30 minutes in 30 L 80% isopropanol with a pH adjustment to 4.0 using 10% sodium carbonate. The washed peel was then dried in a heat cabinet at 65° C. for 10 hours. The dried sample was then milled to a particle size of 250 microns.

The recovery (% of soluble pectin within the sample), the intrinsic viscosity (of the pectin extracted from the sample), degree of esterification of the pectin in the sample (DE), apparent viscosity (of the solution having the sample dissolved or dispersed there through), and water binding capacity of the sample (grams of water/grams of solid matter), were measured and the coil overlap parameter was calculated. The results are summarized in the below table.

TABLE 13

| Sample | Recovery (%) | IV (dL/g) | Coil Overlap (dL/g) | DE (%) | Water Binding (g/g) |
|---|---|---|---|---|---|
| 1 | 32.42 | 8.82 | 2.86 | 70.2 | 17.8 |
| 2 | 38.06 | 8.23 | 3.13 | 69.3 | 20.3 |

TABLE 13-continued

| Sample | Recovery (%) | IV (dL/g) | Coil Overlap (dL/g) | DE (%) | Water Binding (g/g) |
|---|---|---|---|---|---|
| 3 | 33.84 | 8.72 | 2.95 | 69.4 | 18.2 |
| 4 | 26.23 | 10.43 | 2.74 | 70.6 | 17.1 |
| 5 | 29.79 | 9.46 | 2.82 | 69.5 | 18.1 |
| 6 | 38.25 | 8.24 | 3.15 | 70 | 21.3 |
| 7 | 27.79 | 8.77 | 2.44 | 67.6 | 18.4 |
| 8 | 31.81 | 8.91 | 2.83 | 70.5 | 16.6 |
| 9 | 30.97 | 9.17 | 2.84 | 70.5 | 15.8 |

As illustrated in the above table, the functionality of the resulting activated pectin-containing biomass composition is not necessarily affected by whether the mixture of starting pectin-containing biomass material and activating solution is heated during or subsequent to subjecting the mixture to mechanical energy. Thus, suitable activated pectin-containing biomass compositions may be provided irrespective of when the mixture is heated, i.e., either during or after mechanical energy treatment.

Example 7

Fresh orange peel was washed in alcohol using the methods described in U.S. Pat. No. 8,323,513 and then pressed by hand, followed by a second consecutive wash/press and drying, to form dry alcohol washed starting pectin-containing biomass material.

For each sample, a mixture of 1,000 grams (95% dry matter) of alcohol washed, dry peel and an activating solution (150 mL of 62% nitric acid: 30 L 60% alcohol) was processed in an inator.

The mechanical energy was induced by constant recirculation pumping of the sample mixture (material, alcohol, and acid)—more particularly, the sample mixture was continuously recirculated from a 25 L stainless steel vessel (no agitation) through a tube heat exchanger (3 meters in length; 6" outer diameter of 6"; 2 inner tubes, each with a diameter of 1½") maintaining a temperature of 55° C. (Sample 1), 65° C. (Sample 2), or 75° C. (Sample 3), and back to the vessel by a lobe pump (APV, CL/1/021/10) that operated at 50 Hz for a period of 30 minutes.

The drained sample was then conventionally washed for 30 minutes in 30 L 80% isopropanol with a pH adjustment to 4.0 using 10% sodium carbonate. The washed peel was then dried in a heat cabinet at 65° C. for 10 hours. The dried sample was then milled to a particle size of 250 microns.

The recovery (% of soluble pectin within the sample), the intrinsic viscosity (of the pectin extracted from the sample), degree of esterification of the pectin in the sample (DE), apparent viscosity (of the solution having the sample dissolved or dispersed there through), and water binding capacity of the sample (grams of water/grams of solid matter), were measured and the coil overlap parameter was calculated. The results are summarized in the below table.

TABLE 14

| Sample | IV (dL/g) | Recovery (%) | Coil Overlap (dl/g) | DE (%) | VIS (mPa·s) | Water Binding (g/g) |
|---|---|---|---|---|---|---|
| 1 | 7.1 | 30.4 | 2.16 | 67.4 | 196 | 16.6 |
| 2 | 6.5 | 36.1 | 2.35 | 66.2 | 276 | 16.6 |
| 3 | 6.1 | 41.9 | 2.56 | 66.1 | 353 | 22.0 |

As illustrated in the above table, the functionality of the resulting activated pectin-containing biomass composition is affected by the temperature of the activation. At higher temperature of activations, IV tends to decrease, while recovery, coil overlap, apparent viscosity and water binding tend to increase. DE remains practically constant.

Example 8

Fresh orange peel was washed in alcohol using the methods described in U.S. Pat. No. 8,323,513 and then pressed by hand, followed by a second consecutive wash/press, to form alcohol washed starting pectin-containing biomass material.

For each sample, a mixture of 1,000 grams (dry matter) of alcohol washed, pressed peel and an activating solution containing different concentrations of 62% nitric acid in 30 L 60% alcohol, and processed in an inator.

The mechanical energy was induced by constant recirculation pumping of the sample mixture (material, alcohol, and acid)—more particularly, the sample mixture was continuously recirculated from a 25 L stainless steel vessel (no agitation) through a tube heat exchanger (3 meters in length; 6" outer diameter of 6"; 2 inner tubes, each with a diameter of 1½") maintaining a temperature from 55-75° C., and back to the vessel by a lobe pump (APV, CL/1/021/10) that operated at 40-50 Hz for a period of 5-60 minutes.

The drained sample was then conventionally washed for 30 minutes in 30 L 80% isopropanol with a pH adjustment to 4.0 using 10% sodium carbonate. The washed peel was then dried in a heat cabinet at 65° C. for 10 hours. The dried sample was then milled to a particle size of 250 microns.

The recovery (% of soluble pectin within the sample), the intrinsic viscosity (of the pectin extracted from the sample), degree of esterification of the pectin in the sample (DE), and water binding capacity of the sample (grams of water/grams of solid matter) were measured and the coil overlap parameter was calculated. The results are summarized in the below tables with respect to the effect of acid, temperature, energy input and treatment time.

TABLE 15

| Sample | Acid (ml/kg DM) | Temp (° C.) | Time (min) | Energy (kJ) | IV (dl/g) | Recovery (%) | Coil Overlap (dl/g) | DE (%) | Water Binding (g/g) |
|---|---|---|---|---|---|---|---|---|---|
| 1 | 150 | 75 | 15 | 1800 | 7.9 | 35.0 | 2.8 | 69.8 | 21.7 |
| 2 | 150 | 75 | 60 | 7200 | 7.4 | 39.0 | 2.9 | 68.3 | 20.9 |

At fixed acid concentration and temperature with varying treatment time as shown in Table 15, IV tends to be somewhat reduced with longer treatment time, recovery tends to increase somewhat with longer treatment time, coil overlap remains practically constant independent of treatment time, and DE and water binding remain practically constant.

TABLE 16

| Sample | Acid (ml/kg DM) | Temp (° C.) | Time (min) | Energy (kJ) | IV (dl/g) | Recovery (%) | Coil Overlap (dl/g) | DE (%) | Water Binding (g/g) |
|---|---|---|---|---|---|---|---|---|---|
| 3 | 100 | 70 | 20 | 1920 | 8.8 | 32.4 | 2.9 | 70.2 | 17.8 |
| 4 | 100 | 70 | 60 | 5760 | 8.2 | 38.1 | 3.1 | 69.3 | 20.3 |
| 5 | 100 | 70 | 20 | 2400 | 8.7 | 33.8 | 3.0 | 69.4 | 18.2 |

At a lower acid concentration and a lower temperature with varying treatment times as shown in Table 16 as compared to Table 15, IV tends to be somewhat reduced with longer treatment time, recovery tends to increase somewhat with longer treatment time, coil overlap remains practically constant independent of treatment time, and DE remains practically constant. However, water binding tends to increase with increasing treatment time.

TABLE 17

| Sample | Acid (ml/kg DM) | Temp (° C.) | Time (min) | Energy (kJ) | IV (dl/g) | Recovery (%) | Coil Overlap (dl/g) | DE (%) | Water Binding (g/g) |
|---|---|---|---|---|---|---|---|---|---|
| 6 | 150 | 65 | 5 | 600 | 7.3 | 32.9 | 2.4 | 67.1 | 19.0 |
| 7 | 150 | 65 | 30 | 3600 | 7.5 | 38.5 | 2.9 | 68.1 | 19.0 |
| 8 | 150 | 65 | 60 | 7200 | 7.2 | 42.4 | 3.1 | 66.7 | 20.1 |

At a constant acid concentration and a constant low treatment temperature with varying treatment times as shown in Table 17, IV remains pretty constant with treatment times in the range 5-60 minutes, recovery increases with increasing treatment time, coil overlap increases with increasing treatment time, and DE and water binding are practically constant.

TABLE 18

| Sample | Acid (ml/kg DM) | Temp (° C.) | Time (min) | Energy (kJ) | IV (dl/g) | Recovery (%) | Coil Overlap (dl/g) | DE (%) | Water Binding (g/g) |
|---|---|---|---|---|---|---|---|---|---|
| 9 | 250 | 55 | 5 | 600 | 7.9 | 30.8 | 2.4 | 67 | 18.6 |
| 10 | 250 | 55 | 60 | 7200 | 7.2 | 37.9 | 2.7 | 65 | 19.1 |

At a higher acid concentration and even lower treatment temperature with varying treatment time as shown in Table 18, IV tends to decrease with short treatment time, recovery tends to increase with increasing treatment time, coil overlap tends to increase with increasing treatment time, and DE and water binding remain practically constant with treatment times in the range 5-60 minutes.

TABLE 19

| Sample | Acid (ml/kg DM) | Temp (° C.) | Time (min) | Energy (kJ) | IV (dl/g) | Recovery (%) | Coil Overlap (dl/g) | DE (%) | Water Binding (g/g) |
|---|---|---|---|---|---|---|---|---|---|
| 11 | 50 | 65 | 30 | 3600 | 10.1 | 22.1 | 2.2 | 68.9 | 13.7 |
| 12 | 150 | 65 | 30 | 3600 | 7.6 | 36.9 | 2.8 | 67.1 | 19.9 |
| 13 | 250 | 65 | 30 | 3600 | 7.0 | 41.2 | 2.9 | 65.7 | 19.7 |

At constant temperature and treatment time with increasing acid concentration as shown in Table 19, IV is reduced, the recovery is increased, the coil overlap is increased, DE is reduced, and water binding is increased.

Thus, these results show that one can change acid concentration, treatment temperature and treatment time to provide a number of options to optimize the treatment of the activated pectin-containing biomass composition.

The acid concentration is in the range of 50-250 ml 62% nitric acid per kg dry matter, preferably in the range of 100-250 ml 62% nitric acid per kg dry matter, and more preferably 150-250 ml 62% nitric acid per kg dry matter.

The treatment temperature is in the range 55-75° C., preferably 65-75° C. and more preferably 70-75° C.

The treatment time is in the range 5-60 minutes, preferably 15-60 minutes and more preferably 20-60 minutes.

The ideal combination is an acid concentration 150 ml of 62% nitric acid (concentrated nitric acid) per kg dry matter, a treatment temperature of 70° C. and a treatment time of 15 minutes, and if a lower temperature is wished, a higher acid concentration can be applied.

Example 9

This example demonstrates the use of different starting pectin-containing biomass materials and the resulting properties of the activated pectin-containing biomass compositions, which can be used as starting materials for the pectin extraction process.

Apples were pressed. To the pressed pomace was added 63% isopropanol and the pomace was then washed for 5 minutes and pressed. One sample was washed another time in 80% isopropanol, pressed and dried in the drying cabinet. For the other sample, in the Inator was mixed 1 kg dry matter of pressed apple pomace with 24 kg of 60% isopropanol. 100 mL concentrated nitric acid was added per kg dry matter. It was activated at 70° C. for 60 minutes while circulating over the small Lobe pump. After activation, the pomace was pressed. Then it was washed in 60% isopropanol and pressed. Then it was washed in 80% isopropanol and pressed and dried.

Jerusalem artichokes were pressed. To the pressed pomace was added 63% isopropanol and the pomace was then washed for 5 minutes and pressed. One sample was washed another time in 80% isopropanol, pressed and dried in the drying cabinet. For the other sample, in the Inator was mixed 1 kg dry matter of pressed apple pomace with 24 kg of 60% isopropanol. 100 mL concentrated nitric acid was added per kg dry matter. It was activated at 70° C. for 60 minutes while circulating over the small Lobe pump. After activation, the pomace was pressed. Then it was washed in 60% isopropanol and pressed. Then it was washed in 80% isopropanol and pressed and dried.

Oranges were pressed. To the pressed peel was added 63% isopropanol and the peel was then washed for 5 minutes and pressed. One sample was washed another time in 80% isopropanol, pressed and dried in the drying cabinet. For the other sample, in the Inator was mixed 1 kg DM of pressed orange peel with 24 kg of 60% isopropanol. 100 mL concentrated nitric acid was added per kg dry matter. It was activated at 70° C. for 60 minutes while circulating over the small Lobe pump. After activation, the peel was pressed. Then it was washed in 60% isopropanol and pressed. Then it was washed in 80% isopropanol and pressed and dried.

Sugar beet cossettes from the sugar extraction were selected. To the cossettes were added 63% isopropanol and washed for 5 minutes and pressed. One sample was washed another time in 80% isopropanol, pressed and dried in the drying cabinet. For the other sample, in the Inator was mixed 1 kg DM of pressed cossettes with 27 kg of 60% isopropanol. 100 mL concentrated nitric acid was added per kg dry matter. It was activated at 70° C. for 60 minutes while circulating over the small Lobe pump. After activation, the cossettes were pressed. Then they were washed in 60% isopropanol and pressed. Then they were washed in 80% isopropanol and pressed and dried.

TABLE 20

| Sample | Description | Specific energy (kJ/kg DM) | Total mixture (kg) | Specific energy (kJ/kg mixture) | DE (%) | Recovery (%) | IV (dl/g) | Coil Overlap (dl/g) |
|---|---|---|---|---|---|---|---|---|
| 1 | Apple | 10800 | 27 | 400 | 77.4 | 3.0 | 14.5 | 0.4 |
| 2 | Activated apple | 10800 | 27 | 400 | 76.9 | 14.8 | 12.1 | 1.8 |
| 3 | Jerusalem Artichoke | 10800 | 27 | 400 | 54.8 | 9.1 | 1.3 | 0.1 |
| 4 | Activated Jerusalem Artichoke | 10800 | 27 | 400 | 56.8 | 22.2 | 5.5 | 1.2 |
| 5 | Orange | 10800 | 27 | 400 | 70.2 | 15 | 7.8 | 1.2 |
| 6 | Activated orange | 10800 | 27 | 400 | 68.9 | 39 | 7.5 | 2.9 |
| 7 | Beet | 10800 | 30 | 360 | 54.1 | 1.7 | 2.9 | 0.05 |
| 8 | Activated beet | 10800 | 30 | 360 | 54.4 | 15.0 | 3.3 | 0.5 |

Similar patterns were found for of all raw materials tested, i.e. the pectin is made soluble in situ by the activation process. Both the recovery as the coil overlap parameter are several time higher than the corresponding alcohol washed sample without the activation. Activated apple, which is a fruit shows COP close to 2, whereas activated vegetables like Jerusalem Artichoke and activated sugar beet show COP in the range 0.5 to 1.2. Activated orange (citrus) shows the highest COP being greater than 2.

The pectin-containing biomass compositions containing the activated pectin-containing biomass composition having both soluble and insoluble fiber components may be used in many applications, including but not limited to savory products such as soups, sauces and dressings; food supplements; and prebiotics for animal feed. The water holding capacity of the insoluble fiber component facilitates the use of the activated pectin-containing biomass compositions as a liquid absorbent in, for instance, disposable diapers and female hygiene products such as sanitary napkins and panty liners. The soluble pectin component in the activated pectin-containing biomass compositions make them useful in the same applications as extracted pectin, for instance, as disclosed in European Patent No. 1812120B1. By combining the properties of the soluble pectin component to neutralize ammonia and thus eliminate bad odor and the insoluble fiber component to absorb liquid, the activated pectin-containing biomass compositions are also useful in cat litter to absorb liquid and to neutralize ammonia. Additionally, the activated pectin-containing biomass compositions are useful as the starting material for extraction process to make pectin.

Various aspects of the methods for producing an activated pectin-containing biomass composition and an activated pectin-containing composition include the following:

Aspect 1: Method for producing an activated pectin-containing biomass composition, the method comprising:

A) mixing a starting pectin-containing biomass material comprising an insoluble fiber component and an insoluble protopectin component with an aqueous solution of an alcohol to form a mixture;

B) activating the starting pectin-containing biomass material to form an activated pectin-containing biomass material comprising the insoluble fiber component and a soluble pectin component by subjecting the starting pectin-containing biomass material to (i) an activating solution formed by adding acid to the mixture to adjust the pH of the mixture within the range from at or about 0.5 to at or about 2.5 and (ii) heat to a temperature greater than at or about 40 degrees Celsius;

C) applying mechanical energy either (i) to the mixture of step A), (ii) during the activating of step B), or (iii) to the mixture of step A) and during the activating of step B); and D) separating the activated pectin-containing biomass composition from the mixture; wherein during the method the alcohol present in the mixture is at or greater than about 40 weight percent based on the total percent of the mixture.

Aspect 2: The method according to aspect 1, wherein applying mechanical energy in step C) further comprises reducing the starting pectin-containing biomass material in the mixture to its fibrous structure.

Aspect 3: The method according to any one of the preceding aspects, wherein substantially none of the soluble pectin component is extracted from the starting pectin-containing biomass material.

Aspect 4: The method according to according to any one of the preceding aspects, wherein applying mechanical energy in step C) is made by at least one of the following group: a pump, a plate refiner, a disc refiner, an extruder, a lobe pump, and a centrifugal pump.

Aspect 5: The method according to any one of the preceding aspects, wherein the mechanical energy is at or about 800 kilojoules or greater per kilogram dry matter of the starting pectin-containing biomass material or at or about 36 kilojoules or greater per kilogram of the mixture.

Aspect 6: The method according to any one of the preceding aspects, wherein the activated pectin-containing biomass composition has a coil overlap parameter of at or about 2.0 or greater.

Aspect 7: The method according to any one of the preceding aspects, wherein subjecting to heat is within the temperature range of from at or about 60 to at or about 80 degrees Celsius for a time period within the range from at or about 15 to at or about 60 minutes.

Aspect 8: The method according to any one of the preceding aspects, wherein step D) further comprises adjusting the pH of the activated pectin-containing biomass composition to a range from at or about 3.5 to at or about 4.5.

Aspect 9: The method according to any one of the preceding aspects, wherein the mechanical energy is at or about 1200 kilojoules or greater per kilogram dry matter of the starting pectin-containing biomass material or at or about 40 kilojoules or greater per kilogram of the mixture.

Aspect 10: The method according to aspect 9, wherein the activated pectin-containing biomass composition has a coil overlap parameter of at or about 2.3 or greater.

Aspect 11: The method according to any one of the preceding aspects, wherein the mechanical energy is at or about 1900 kilojoules or greater per kilogram dry matter of the starting pectin-containing biomass material or at or about 60 kilojoules or greater per kilogram of the mixture.

Aspect 12: The method according to aspect 11, wherein the activated pectin-containing biomass composition has a coil overlap parameter of at or about 2.5 or greater.

Aspect 13: The method according to any one of the preceding aspects, further comprising drying, milling or both drying and milling the separated activated pectin-containing biomass composition.

Aspect 14: The method according to any one of the preceding aspects, wherein the starting pectin-containing biomass material in step A) is obtained from citrus fruit.

Aspect 15: The method according to aspect 14, wherein the starting pectin containing biomass material is an alcohol washed citrus peel.

Aspect 16: The method according to any one of the preceding aspects 14-15, wherein the activated pectin-containing biomass composition comprises both a coil overlap parameter of at or about 2 or greater and a degree of esterification of the soluble pectin component of at or about 60 percent or higher.

Aspect 17: The method according to any one of the preceding aspects 14-16, wherein the activated pectin-containing biomass composition comprises one or more properties of the following group: an apparent viscosity from at or about 150 mPa·s to at or about 3500 mPa·s when measured in aqueous solution at a temperature of 25 degrees Celsius and pH 4.0 using a Brookfield Viscometer, a water binding capacity from at or about 14 g/g to at or about 27 g/g, the soluble pectin component present in an amount from at or about 20% to at or about 45% by weight of the activated pectin-containing biomass composition, and a pH from at or about 2.5 to at or about 5.5.

Aspect 18: An activated pectin-containing biomass composition obtained from citrus fruit, comprising:
an insoluble fiber component comprising cellulosic material; and
a soluble pectin component comprising readily soluble pectin;
wherein the activated pectin-containing biomass composition has a coil overlap parameter of at or about 2 or greater.

Aspect 19: The activated pectin-containing biomass composition according to aspect 18, wherein the insoluble fiber component and the soluble pectin component form an open structure allowing liquid to access the readily soluble pectin.

Aspect 20: The activated pectin-containing biomass composition according to any one of the preceding aspects 18-19, wherein the activated pectin-containing biomass composition comprises at or about 80 to at or about 55 weight percent insoluble fiber component and at or about 20 to at or about 45 weight percent soluble pectin component.

Aspect 21: The activated pectin-containing biomass composition according to any one of the preceding aspects 18-20, wherein a degree of esterification of the soluble pectin component is at or about 60 percent or higher.

Aspect 22: The activated pectin-containing biomass composition according to any of the preceding aspects 18-20, wherein the coil overlap parameter is at or about 2.3 or greater.

Aspect 23: The activated pectin-containing biomass composition according to any of the preceding aspects 18-20, wherein the coil overlap parameter is at or about 2.5 or greater.

Aspect 24: The activated pectin-containing biomass composition according to any one of the preceding aspects 18-24, wherein the activated pectin-containing biomass composition comprises one or more properties of the following group: an apparent viscosity from at or about 150 mPa·s to at or about 3500 mPa·s when measured in aqueous solution at a temperature of 25 degrees Celsius and pH 4.0 using a Brookfield Viscometer, a water binding capacity from at or about 14 g/g to at or about 27 g/g, the soluble pectin component present in an amount from at or about 20% to at or about 45% by weight of the activated pectin-containing biomass composition, and a pH from at or about 2.5 to at or about 5.5.

Aspect 25: An activated pectin-containing biomass composition, comprising:
an insoluble fiber component comprising cellulosic material; and
a soluble pectin component comprising readily soluble pectin;
wherein the activated pectin-containing biomass composition (i) is obtained from a starting pectin-containing biomass material selected from apple, Jerusalem artichoke, or beet, (ii) has a coil overlap parameter within the range of at or about 0.5 to at or about 2.0, (iii) and has a coil overlap parameter at least about 300 percent greater than that of a coil overlap parameter of the starting pectin-containing biomass material.

Aspect 26: The activated pectin-containing biomass composition according to any of the preceding aspects 18-25, being a food ingredient.

Aspect 27: The activated pectin-containing biomass composition, according to any of the preceding aspects 18-25, used as a starting material for extracting pectin.

Aspect 28: A product comprising the activated pectin-containing biomass composition derived from the method of any one of the preceding aspects 1-17, or comprising the activated pectin-containing biomass composition according to aspect any one of the preceding aspects 18-26.

We claim:

1. A method for producing an activated pectin-containing biomass composition, the method comprising:
   A) mixing a starting pectin-containing biomass material comprising an insoluble fiber component and an insoluble protopectin component with an aqueous solution of an alcohol to form a mixture;
   B) activating the starting pectin-containing biomass material to form an activated pectin-containing biomass material comprising the insoluble fiber component and a soluble pectin component by subjecting the starting pectin-containing biomass material to (i) an activating solution formed by adding acid to the mixture to adjust the pH of the mixture within the range from at or about 0.5 to at or about 2.5, and (ii) heat to a temperature greater than at or about 40 degrees Celsius;
   C) applying mechanical energy either (i) to the mixture of step A), (ii) during the activating of step B), or (iii) to the mixture of step A) and during the activating of step B); and
   D) separating the activated pectin-containing biomass composition from the mixture;
   wherein during the method the alcohol present in the mixture in each step is at or greater than about 40 weight percent based on the total weight of the mixture in each step.

2. The method according to claim 1, wherein applying mechanical energy in step C) further comprises reducing the starting pectin-containing biomass material in the mixture to its fibrous structure.

3. The method according to claim 1, wherein substantially none of the soluble pectin component is extracted from the starting pectin-containing biomass material.

4. The method according to claim 1, wherein applying mechanical energy in step C) is made by at least one of the following group: a pump, a plate refiner, a disc refiner, an extruder, a lobe pump, and a centrifugal pump.

5. The method according to claim 1, wherein the mechanical energy is at or about 800 kilojoules or greater per kilogram dry matter of the starting pectin-containing biomass material, or at or about 36 kilojoules or greater per kilogram of the mixture.

6. The method according to claim 1, wherein the activated pectin-containing biomass composition has a coil overlap parameter of at or about 2.0 or greater.

7. The method according to claim 1, wherein subjecting to heat is within the temperature range of from at or about 60 to at or about 80 degrees Celsius for a time period within the range from at or about 15 to at or about 60 minutes.

8. The method according to claim 1, wherein step D) further comprises adjusting the pH of the activated pectin-containing biomass composition to a range from at or about 3.5 to at or about 4.5.

9. The method according to claim 1, wherein the mechanical energy is at or about 1200 kilojoules or greater per kilogram dry matter of the starting pectin-containing biomass material, or at or about 40 kilojoules or greater per kilogram of the mixture.

10. The method according to claim 9, wherein the activated pectin-containing biomass composition has a coil overlap parameter of at or about 2.3 or greater.

11. The method according to claim 1, wherein the mechanical energy is at or about 1900 kilojoules or greater per kilogram dry matter of the starting pectin-containing biomass material, or at or about 60 kilojoules or greater per kilogram of the mixture.

12. The method according to claim 11, wherein the activated pectin-containing biomass composition has a coil overlap parameter of at or about 2.5 or greater.

13. The method according to claim 1, further comprising drying, milling or both drying and milling the separated activated pectin-containing biomass composition.

14. The method according to claim 1, wherein the starting pectin-containing biomass material in step A) is obtained from citrus fruit.

15. The method according to claim 14, wherein the starting pectin-containing biomass material is an alcohol washed citrus peel.

16. The method according to claim 14, wherein the activated pectin-containing biomass composition comprises both a coil overlap parameter of at or about 2 or greater and a degree of esterification of the soluble pectin component of at or about 60 percent or higher.

17. The method according to claim 14, wherein the activated pectin-containing biomass composition comprises one or more properties of the following group: an apparent viscosity from at or about 150 mPa·s to at or about 3500 mPa·s when measured in aqueous solution at a temperature of 25 degrees Celsius and pH 4.0 using a Brookfield Viscometer, a water binding capacity from at or about 14 g/g to at or about 27 g/g, the soluble pectin component present in an amount from at or about 20% to at or about 45% by weight of the activated pectin-containing biomass composition, and a pH from at or about 2.5 to at or about 5.5.

18. The method according to claim 1, wherein the acid comprises nitric acid, citric acid, oxalic acid, hydrochloric acid, sulfuric acid, phosphoric acid, or a combination thereof.

19. The method according to claim 1, wherein the activated pectin-containing biomass composition has a coil overlap parameter of at or about 2 to at or about 4.5.

20. The method according to claim 1, wherein a degree of esterification of the soluble pectin component is at or about 60 percent to at or about 74 percent.

21. The method according to claim 1, wherein the starting pectin-containing biomass material in step A) is obtained from apple, Jerusalem artichoke, or beet.

22. The method according to claim 21, wherein the activated pectin-containing biomass composition has a coil overlap parameter within the range of at or about 0.5 to at or about 2.0, and has a coil overlap parameter that is at least about 300 percent greater than that of a coil overlap parameter of the starting pectin-containing biomass material.

23. The method according to claim 21, wherein the activated pectin-containing biomass composition comprises at or about 14 to at or about 23 weight percent soluble pectin component.

24. The method accordingly to claim 21, wherein a degree of esterification of the soluble pectin component is at or about 54 percent to at or about 77 percent.

25. The method according to claim 14, wherein the activated pectin-containing biomass composition:
   comprises at or about 80 to at or about 55 weight percent insoluble fiber component and at or about 20 to at or about 45 weight percent soluble pectin component; and has a coil overlap parameter of at or about 2 to at or about 4.5.

26. The method according to claim 25, wherein the composition has an apparent viscosity from at or about 150 mPa·s to at or about 3500 mPa·s when measured in an aqueous solution at a temperature of 25 degrees Celsius and pH 4.0 using a Brookfield Viscometer.

27. The method according to claim 15, wherein the activated pectin-containing biomass composition:
   comprises at or about 80 to at or about 55 weight percent insoluble fiber component and at or about 20 to at or about 45 weight percent soluble pectin component; and
   has a coil overlap parameter of at or about 2 to at or about 4.5.

28. The method according to claim 27, wherein the composition has an apparent viscosity from at or about 150 mPa·s to at or about 3500 mPa·s when measured in an aqueous solution at a temperature of 25 degrees Celsius and pH 4.0 using a Brookfield Viscometer.

* * * * *